US010257641B2

(12) United States Patent
Tsuda et al.

(10) Patent No.: US 10,257,641 B2
(45) Date of Patent: Apr. 9, 2019

(54) METHOD, NON-TRANSITORY COMPUTER READABLE STORAGE MEDIUM, DEVICE AND SYSTEM TO UPDATE INFORMATION ON A DEVICE

(71) Applicant: Sony Corporation, Tokyo (JP)

(72) Inventors: Shinichiro Tsuda, Kanagawa (JP); Takashi Usui, Tokyo (JP); Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 116 days.

(21) Appl. No.: 14/405,210

(22) PCT Filed: May 7, 2013

(86) PCT No.: PCT/JP2013/002940
§ 371 (c)(1),
(2) Date: Dec. 3, 2014

(87) PCT Pub. No.: WO2013/186980
PCT Pub. Date: Dec. 19, 2013

(65) Prior Publication Data
US 2015/0148064 A1 May 28, 2015

(30) Foreign Application Priority Data
Jun. 12, 2012 (JP) ................... 2012-132467

(51) Int. Cl.
H04W 4/02 (2018.01)
H04W 8/24 (2009.01)
(Continued)

(52) U.S. Cl.
CPC .............. *H04W 4/02* (2013.01); *G01C 21/32* (2013.01); *G01C 21/3694* (2013.01);
(Continued)

(58) Field of Classification Search
None
See application file for complete search history.

(56) References Cited

U.S. PATENT DOCUMENTS 7,477,903 B2 * 1/2009 Wilcock ................ G01S 5/0226
340/988
8,165,586 B2 * 4/2012 Krishnamurthy ..... H04L 5/0007
370/254
(Continued)

FOREIGN PATENT DOCUMENTS

JP 2001-155290 A 6/2001
JP 2003-289559 A 10/2003
(Continued)

OTHER PUBLICATIONS

Michalopoulos, Vehicle Detection Video Through Image Processing: The Autoscope System, IEEE Transactions on Vehicular Technology, 1991, vol. 40, No. 1, pp. 21-29.
(Continued)

*Primary Examiner* — Charles N Appiah
*Assistant Examiner* — Frank E Donado
(74) *Attorney, Agent, or Firm* — Chip Law Group

(57) ABSTRACT

The present application relates to a method whereby the communication traffic between a wireless communication apparatus such as a smartphone and another device such as a map information providing server and/or server managed by mobile virtual network operator MVNO. According to a first aspect, the communication traffic can be reduced by dividing items of geographical information that are sent to the smartphone are divided into static information and dynamic information and the two types of information are separately processed in that the map data is updated less often than information such as traffic congestion, weather information or the congestion level of a base station. According to a second aspect, congestion information is
(Continued)

derived by averaging over time the number of vehicles which pass through a certain point. According to a third aspect, the updating interval, i.e. the frequency by which new information will be downloaded from the server, is adapted to degree of change of the dynamic information over time. According to a fourth aspect, the updating interval is adapted to the movement speed of the smartphone. According to a fifth aspect, download rates of a communication carrier are displayed on top of a map, thereby providing some sort of geobrowsing. According to a sixth aspect, an MVNO informs its subscribers about base station related information, such as signal intensity and the base station's congestion level. According to a seventh aspect, the smartphone selects, on the basis of the various items of information received, another network, either manually or automatically.

16 Claims, 21 Drawing Sheets

(51) Int. Cl.
  *G01C 21/32* (2006.01)
  *G01C 21/36* (2006.01)
  *H04W 4/90* (2018.01)
  *H04M 1/725* (2006.01)

(52) U.S. Cl.
  CPC .......... *H04W 8/24* (2013.01); *H04M 1/72572* (2013.01); *H04W 4/90* (2018.02)

(56) References Cited

U.S. PATENT DOCUMENTS

| | | | | |
|---|---|---|---|---|
| 8,761,797 B1* | 6/2014 | Norton | ................... | H04W 64/00 455/456.1 |
| 8,996,002 B2* | 3/2015 | Rodgers | ................ | H04W 8/183 455/435.2 |
| 2007/0232321 A1* | 10/2007 | Casati | ................... | H04W 60/04 455/456.1 |
| 2008/0153470 A1* | 6/2008 | Ohsako | ................. | H04W 48/16 455/414.3 |
| 2009/0055256 A1 | 2/2009 | Donahue et al. | | |
| 2009/0070190 A1 | 3/2009 | Gorty et al. | | |
| 2009/0315767 A1* | 12/2009 | Scalisi | .................... | G01S 19/49 342/357.74 |
| 2010/0063854 A1* | 3/2010 | Purvis | .................... | G06Q 10/02 705/5 |
| 2012/0083278 A1* | 4/2012 | Kazmi | .................. | H04W 64/00 455/440 |
| 2012/0110174 A1* | 5/2012 | Wootton | ................ | G06F 21/564 709/224 |
| 2013/0029655 A1* | 1/2013 | Gao | ....................... | H04L 5/0048 455/422.1 |
| 2013/0244686 A1* | 9/2013 | Saha | ..................... | G06F 1/3206 455/456.1 |

FOREIGN PATENT DOCUMENTS

| | | |
|---|---|---|
| JP | 2004-180204 A | 6/2004 |
| JP | 2004-235976 A | 8/2004 |
| JP | 2004-260722 A | 9/2004 |
| JP | 2005-235976 A | 9/2005 |
| JP | 2009-150839 A | 7/2009 |
| JP | 2012-070133 A | 4/2012 |
| JP | 2012-095324 A | 5/2012 |

OTHER PUBLICATIONS

Office Action for JP Patent Application No. 2012-132467, dated Oct. 20, 2015, 11 pages of Office Action.

* cited by examiner

| | ID INFORMATION 201 | NAME 202 | UPDATING INTERVAL 203 | LATEST UPDATE TIME 204 | CATEGORY TYPE 205 |
|---|---|---|---|---|---|
| 1 | M001 | MAP INFORMATION | 1 HOUR | 7:00 | 1 |
| 2 | C002 | COMMUNICATION CARRIER | 5 MINUTES | 8:45 | 2 |
| 3 | CR03 | COMMUNICATION RATE | 5 MINUTES | 8:45 | 2 |
| ⋮ | ⋮ | ⋮ | ⋮ | ⋮ | ⋮ |

| | ID INFORMATION 201 | NAME 202 | UPDATING INTERVAL 203 | LATEST UPDATE TIME 204 | CATEGORY TYPE 205 |
|---|---|---|---|---|---|
| 1 | M001 | MAP INFORMATION | BASED ON INSTRUCTION FROM AREA DETERMINING UNIT | 7:00 | 2 |
| 2 | C002 | COMMUNICATION CARRIER | 5 MINUTES | 8:45 | 2 |
| 3 | CR03 | COMMUNICATION RATE | 5 MINUTES | 8:45 | 2 |
| ⋮ | ⋮ | ⋮ | ⋮ | ⋮ | ⋮ |

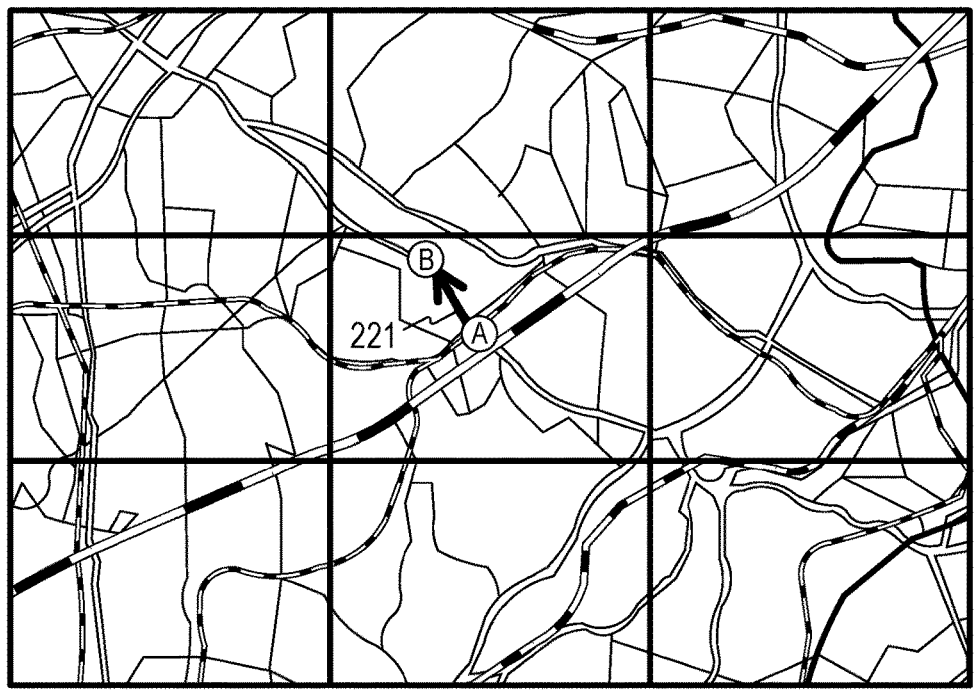

| 23-34 | 24-34 | 25-34 |
| --- | --- | --- |
| 23-35 | 24-35 | 25-35 |
| 23-36 | 24-36 | 25-36 |

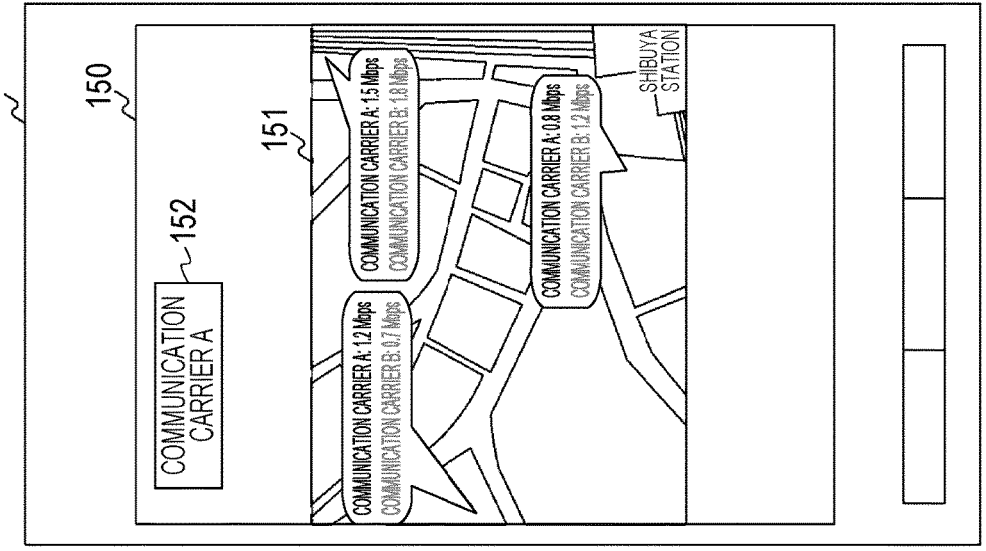
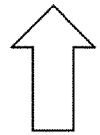
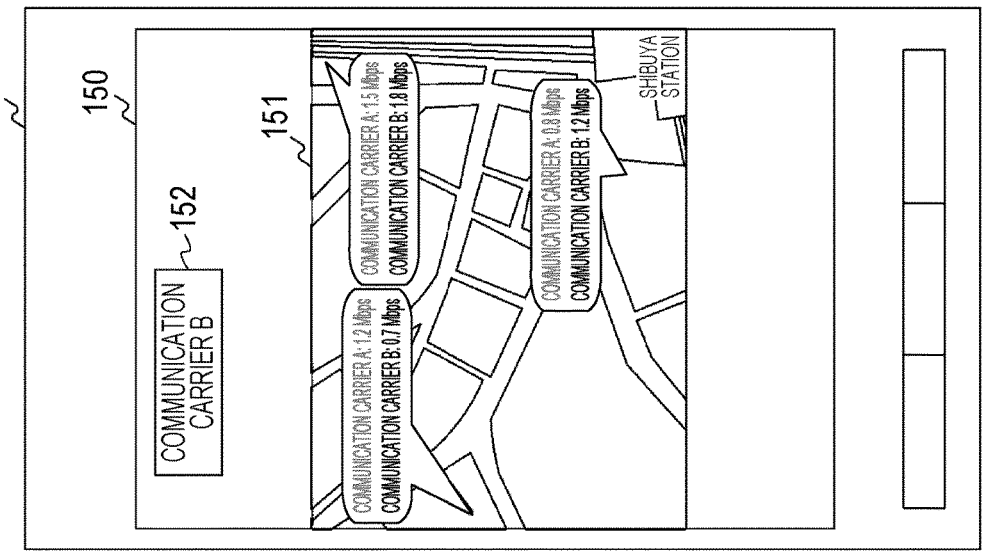
FIG. 12A
FIG. 12B

METHOD, NON-TRANSITORY COMPUTER READABLE STORAGE MEDIUM, DEVICE AND SYSTEM TO UPDATE INFORMATION ON A DEVICE

CROSS REFERENCE TO RELATED APPLICATIONS

This application is a national stage application under 35 U.S.C. § 371 of International Application No. PCT/JP2013/002940, filed May 7, 2013, which claims priority to Japanese Application No. JP2012-132467, filed on Jun. 12, 2012 and which is hereby incorporated by reference in its entirety.

TECHNICAL FIELD

The present technology relates to an information processing apparatus, and more specifically, to an information processing apparatus, a communication system, and an information processing method that control the frequency of updating of information in a wireless communication apparatus.

BACKGROUND ART

Hitherto, wireless communication apparatuses connected to a network, such as a public wireless network, are widely used. From the year of 2002, third generation (3G) mobile phone services (called "third generation" in Japan) were started. When these mobile phone services were started, small size packets, such as voice, email, etc. were mainly handled as applications. However, due to the introduction of High Speed Downlink Packet Access (HSDPA), users are now able to download relatively large size packets, such as music files, moving pictures, etc.

These days, high-functionality wireless communication apparatuses (e.g., smartphones) mainly handling packet communication are coming into widespread use. Additionally, by considering a situation in which communication carriers and service providers using the Internet are providing user oriented services to users in mobile environments, position information is becoming an influential factor. Accordingly, wireless communication apparatuses having a function of obtaining position information are coming into widespread use.

For example, an electronic device that obtains position information indicating the position of the electronic device at predetermined regular intervals has been proposed (e.g., see PTL. 1).

CITATION LIST

Patent Literature

PTL 1: JP 2009-150839A

SUMMARY

Technical Problem

These days, as various services are being more and more provided, communication traffic between a wireless communication apparatus and an information processing apparatus is being increased. Accordingly, it is necessary that communication traffic be reduced by suitably updating various items of information, such as position information.

It is thus desirable to reduce communication traffic by suitably updating information in a wireless communication apparatus.

Solution to Problem

Accordingly, some embodiments are directed to a method for controlling updating of information stored on a device, the information comprising information of a first type and information of a second type. The method comprises: determining, using at least one processor, when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

Other embodiments are directed to at least one non-transitory computer readable storage medium storing processor-executable instructions that, when executed by at least one processor, cause the at least one processor to perform a method for controlling updating of information stored on a device, the information comprising information of a first type and information of a second type. The method comprises determining when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

Still other embodiments are directed to a device. The device comprises at least one non-transitory computer-readable storage medium storing at least a first item of information of a first type and at least a second item of information of a second type, and at least one processor programmed to control updating of information stored on the at least one non-transitory computer-readable storage medium at least in part by:

determining when a first item of information of the first type and a second item of information of the second type are to be updated, wherein the second item of information is to be updated more frequently than the first item of information; and updating the first and second items of information in accordance with the determination at least in part by wirelessly communicating with at least one other device.

Still other embodiments are directed to a system comprising a device comprising at least one non-transitory computer-readable storage medium storing at least a first item of information of a first type and at least a second item of information of a second type; and at least one computer configured to control updating of information stored on the at least one non-transitory computer-readable storage medium at least in part by: determining when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

Advantageous Effects of Invention

According to some embodiments of the present technology, it may be possible to reduce communication traffic by suitably updating information in a wireless communication apparatus.

BRIEF DESCRIPTION OF DRAWINGS

FIG. 2 schematically illustrates management content of an updating information manager according to the first embodiment of the present technology.

FIG. 4 illustrates an example of area determining processing performed by an area determining unit according to the first embodiment of the present technology.

FIG. 12 illustrates an example of a display screen displayed on a display unit according to the third embodiment of the present technology.

DESCRIPTION OF EMBODIMENTS

Some embodiments of the present technology will be described below. A description will be given in the following order.

1. First Embodiment (information updating control: an example in which first information and second information are updated with different frequencies)
2. Second Embodiment (information sending control: an example in which the frequency of sending of second information to an information processing apparatus is controlled)
3. Third Embodiment (switching control of wireless communication method: an example in which the wireless communication method or contract authentication information is switched)
4. Fourth Embodiment (information sending control: an example in which the frequency of sending of second information from a wireless communication apparatus is specified by an information processing apparatus)

1. First Embodiment

Figure 1:
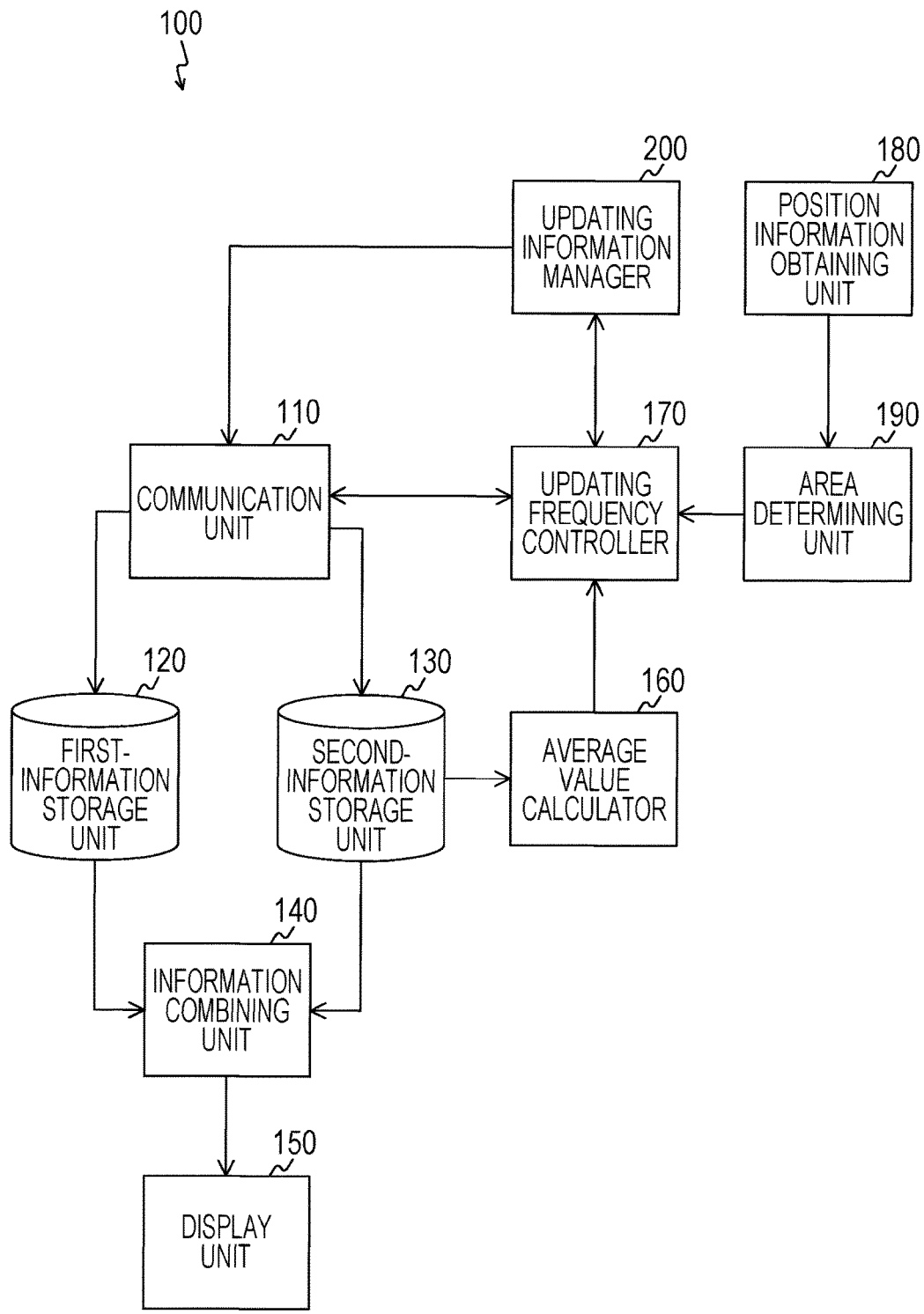
FIG. 1 is a block diagram illustrating an example of the functional configuration of a wireless communication apparatus according to a first embodiment of the present technology.

Example of Functional Configuration of Wireless Communication Apparatus of First Embodiment FIG. 1 is a block diagram illustrating an example of the functional configuration of a wireless communication apparatus 100 according to a first embodiment of the present technology.

The wireless communication apparatus 100 includes a communication unit 110, a first-information storage unit 120, a second-information storage unit 130, an information combining unit 140, a display unit 150, an average value calculator 160, an updating frequency controller 170, a position information obtaining unit 180, an area determining unit 190, and an updating information manager 200. The wireless communication apparatus 100 may be realized by a mobile phone, a smartphone, or a notebook personal computer (PC) or a tablet terminal having a communication function. The wireless communication apparatus 100 is an example of an information processing apparatus or a wireless communication apparatus.

The communication unit 110 sends and receives various items of information to and from another information processing apparatus (e.g., a server) (not shown) by utilizing wireless communication under the control of the updating frequency controller 170. For example, the communication unit 110 performs wireless communication by utilizing a 3G network. The communication unit 110 also categorizes items of information received from other information processing apparatuses into two types, i.e., first information and second information, on the basis of updating information stored in the updating information manager 200, and stores the first information and the second information in the first-information storage unit 120 and the second-information storage unit 130, respectively. For example, if the communication unit 110 receives first information from another information processing apparatus, the communication unit 110 stores the received first information in the first-information storage unit 120. If the communication unit 110 receives second information from another information processing apparatus, the communication unit 110 stores the received second information in the second-information storage unit 130.

The first information and the second information are information concerning wireless communication, and also, are information necessary for, for example, a user, and the content of such information is changed. More specifically, the first and second information concerning wireless communication are parameters necessary for forming a wireless signal or a communication system, such as a communication method, a modulation method, a carrier frequency, a signal intensity, and reporting information, or values calculated from these parameters. The first and second information concerning wireless communication also include information concerning characters and images transmitted through wireless communication. The information concerning characters and images includes all items or some items of information necessary for generating characters and images.

The content of the first and second information changes over time. The first information is information which changes by a smaller degree over time than the second information. That is, the degree by which the first information changes over time (on a time axis) is small. Thus, the first information has static characteristics. In contrast, the degree by which the second information changes over time (on a time axis) is large and thus, the second information has dynamic characteristics.

Concerning character or image information, too, information which changes by a small degree over time is handled as the first information, while information which changes by a large degree over time is handled as the second information. For example, if there is no considerable movement in a certain area, there is not much temporal change in map information about this area, and thus, the map information is handled as the first information. In contrast, there may be a considerable change in information to be superposed on map information, such as information concerning advertisements, the congestion in a train or a store, or the occupancy rate of wireless resources of a certain base station (the congestion level of a base station). Accordingly, such information, which changes by a large degree over time, is handled as the second information.

The first information (information which concerns wireless communication and which changes by a small degree over time) may be information concerning the intensity of a pilot signal, a reference signal, or a beacon signal received from a base station connected to the wireless communication apparatus 100. The first information may also be information concerning the communication quality calculated from the intensity of an interference signal received from a base station around the wireless communication apparatus 100. That is, the first information may be information concerning the ratio of the intensity of interference power received from one or a plurality of base stations or a cell around the wireless communication apparatus 100 to the intensity of a pilot signal, a reference signal, or a beacon signal received from a base station connected to the wireless communication apparatus 100 or a cell in which the wireless communication apparatus 100 is disposed.

The second information (information which concerns wireless communication and which changes by a large degree over time) may be information concerning the allocation of wireless resources, which are momentarily changed, to a base station connected to the wireless communication apparatus 100 (information concerning the situation of allocation of wireless resources). For example, it is assumed that the communication method is a code division multiple access (CDMA) method. In this case, the allocation of wireless resources is the ratio of power allocated to a signal spread by codes, e.g., codes for High Spread-Downlink Shared Channel (HS-DSCH), used for data transmission. That is, in the case of the CDMA method, the second information may be an index regarding the ratio of power allocated to a data transmission channel per frame. In the case of an orthogonal frequency division multiplexing (OFDM) method, the allocation of wireless resources is the ratio of the number of sub-carriers allocated to transmission data to the total number of sub-carriers per frame. That is, in the case of the OFDM method, the second information may be an index regarding the ratio of the number of sub-carriers allocated to transmission data to the total number of sub-carriers per frame. In this case, the index regarding the ratio of the number of sub-carriers may be an index regarding the ratio of power allocated to sub-carriers, in which case, the base for the ratio may be total power which can be allocated to all sub-carriers or reception average power of a reference signal.

The second information may be user's subjective opinion information concerning a situation of the congestion of a road, a train or a store, weather, or temperature, which is momentarily changing. The second information may be information indicating a numeric value obtained from such user's subjective opinion information.

The first and second information may be information which is dependent on position information. For example, the above-described intensity of an interference signal received from a base station around the wireless communication apparatus 100 changes depending on the relative positional relationship between the wireless communication apparatus 100 and the base station around the wireless communication apparatus 100.

Another information processing apparatus (e.g., a server) which sends and receives various items of information to and from the wireless communication apparatus 100 provides such first and second information to the wireless communication apparatus 100 by utilizing wireless communication. It can be assumed that such an information processing apparatus (e.g., a server) is managed by a communication carrier providing wireless connection services, e.g., a mobile virtual network operator (MVNO). The MVNO is a virtual communication carrier.

The first-information storage unit 120 is a storage unit which stores therein first information (information which concerns wireless communication and which changes by a small degree over time). The second-information storage unit 130 is a storage unit which stores therein second information (information which concerns wireless communication and which changes by a large degree over time). That is, information which changes by a small degree over time is stored in the first-information storage unit 120 and is processed, and information which changes by a large degree over time is stored in the second-information storage unit 130 and is processed.

The information combining unit 140 generates new information (third information) by combining first information stored in the first-information storage unit 120 with second information stored in the second-information storage unit 130. The information combining unit 140 displays the generated new information (third information) on the display unit 150.

Figure 3:
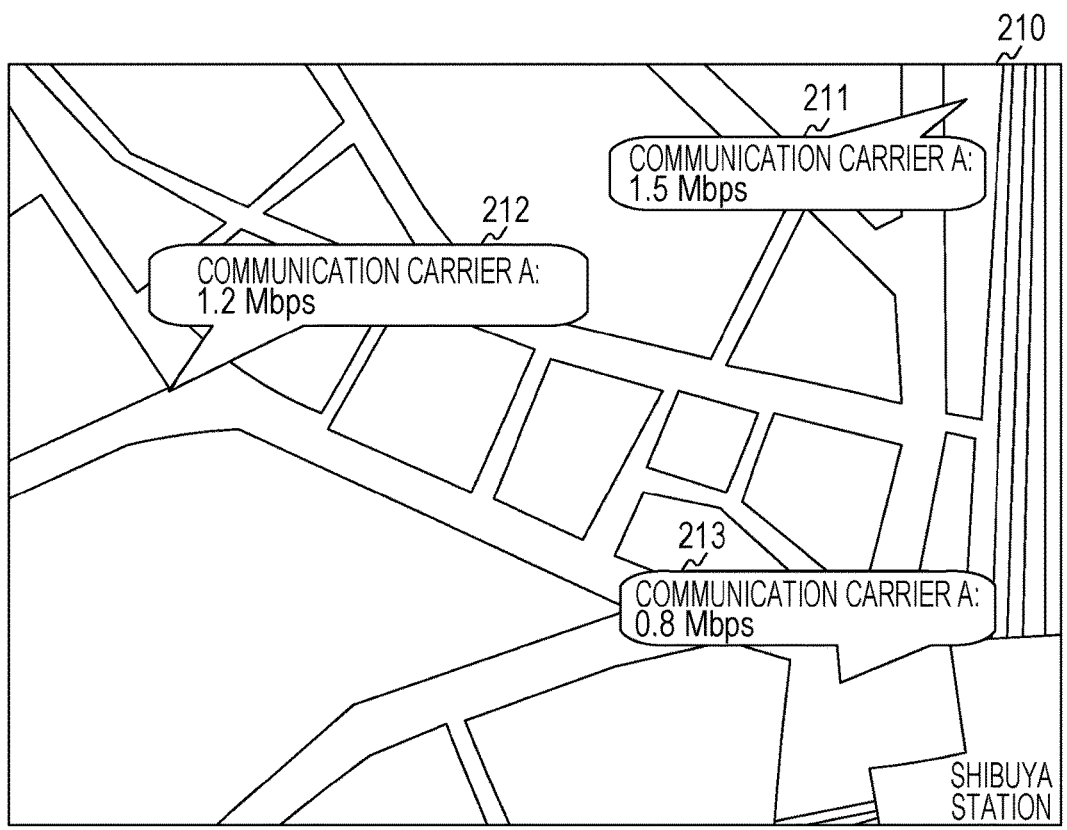
FIG. 3 illustrates an example of a display screen displayed on a display unit according to the first embodiment of the present technology.

The information combining unit 140 is capable of performing various synthesis operations, such as the four arithmetic operations of various items of information, synthesis of items of image information, and synthesis of items of character information. For example, the information combining unit 140 may perform synthesis by superposing character information or image information stored in the second-information storage unit 130 on map information stored in the first-information storage unit 120. An example of a display screen obtained as a result of such a synthesis operation is shown in FIG. 3.

The display unit 150 is a display that displays new information (third information) generated by a synthesis operation of the information combining unit 140. As the display unit 150, a display panel, for example, an organic electroluminescence (EL) panel or a liquid crystal display (LCD) panel, may be used. As the display unit 150, a touch panel which enables a user to input the content of an operation by bringing a finger to contact or close to a display screen of the touch panel may be used. Alternatively, the display screen itself of a mobile phone, a smartphone, or a notebook PC or a tablet terminal having a communication function may be used as the display unit 150. Alternatively, part of the above-described display screen may be used specially as the display unit 150.

The average value calculator 160 calculates average values of items of second information stored in the second-information storage unit 130, and outputs calculation results to the updating frequency controller 170. The average value calculator 160 calculates average values of items of second information stored in the second-information storage unit 130 such that the second information may be updated with a frequency level higher than that of the first information stored in the first-information storage unit 120. An approach to calculating average values will be discussed in detail later with reference to FIGS. 6A and 6B.

The updating frequency controller 170 manages and controls timing at which first information stored in the first-information storage unit 120 is updated and timing at which second information stored in the second-information storage unit 130 is updated.

If the updating frequency controller 170 determines that it is necessary to update first information stored in the first-information storage unit 120, it performs control so that the communication unit 110 will request another information processing apparatus to send a new version of first information to be stored in the first-information storage unit 120. The updating frequency controller 170 also performs control so that the communication unit 110 will receive first information from another information processing apparatus. Additionally, the updating frequency controller 170 is able to determine, from a predetermined lapse of time after the previous updating time, timing at which first information stored in the first-information storage unit 120 will be updated. Alternatively, the updating frequency controller 170 may detect a change in first information stored in the first-information storage unit 120 and determine timing at which the first information will be updated.

The updating frequency controller 170 may also control the updating of second information stored in the second-information storage unit 130 in accordance with a change in the second information stored in the second-information storage unit 130. For example, if it is necessary to obtain second information to be stored in the second-information storage unit 130 from another information processing apparatus, the updating frequency controller 170 performs control so that the communication unit 110 will request another information processing apparatus to send a new version of second information to be stored in the second-information storage unit 130. The updating frequency controller 170 also performs control so that the communication unit 110 will receive second information from another information processing apparatus.

The updating frequency controller 170 may control the frequency of updating of second information stored in the second-information storage unit 130 in accordance with a value output from the average value calculator 160. For example, the updating frequency controller 170 may control the frequency of updating of second information stored in the second-information storage unit 130 in accordance with an amount of change per unit time output from the average value calculator 160. That is, the updating frequency controller 170 may perform control so that the frequency of updating of second information will be changed on the basis of a predetermined value contained in the second information.

In the second-information storage unit 130, information obtained by an information obtaining apparatus, such as a sensor, provided in the wireless communication apparatus 100 may be stored. In this case, the updating frequency controller 170 may control the operating period of the information obtaining apparatus. The information obtaining apparatus may be a global positioning system (GPS) receiver, a gyro sensor, an acceleration sensor, a temperature sensor, or an air pressure sensor. For example, a change in the air pressure is small for a person constantly working in the fourth floor of a building, while a change in the air pressure is large for a person who may be up and down in the building to deliver parcels. It is thus assumed that there is not much change in the second information of a wireless communication apparatus owned by a person constantly working in the fourth floor of a building. Thus, the updating frequency controller 170 sets a long operating period of the information obtaining apparatus so that the second information will not be frequently updated.

It is assumed, for example, that second information to be stored in the second-information storage unit 130 is obtained from another information processing apparatus (e.g., a server) and is updated. In this case, if the second information is frequently updated even if there is not much change in the second information, communication resources or power consumed by using a communication function are wasted. Similarly, if second information to be stored in the second-information storage unit 130 is obtained from an information obtaining apparatus, such as a sensor, and is updated, and if it is frequently updated even if there is not much change in the second information, power consumed in the information obtaining apparatus is wasted. Accordingly, if a change in the second information is small, the updating frequency controller 170 may preferably perform control so that the frequency of obtaining of the second information will be decreased. The updating frequency controller 170 is an example of a controller.

The position information obtaining unit 180 obtains information (position information) concerning the position at which the wireless communication apparatus 100 is disposed, and outputs obtained position information to the area determining unit 190. As the position information obtaining unit 180, a GPS receiver that receives a GPS signal and calculates position information (e.g., information concerning the latitude, longitude, and height) on the basis of this GPS signal may be used. The position information obtaining unit 180 may obtain, via a server, data related to identification information concerning a base station connected to the wireless communication apparatus 100 (such identification information has been obtained by the wireless communication apparatus 100), and may utilize position information specified by the data related to this identification information.

The area determining unit 190 determines, on the basis of the position information obtained by the position information obtaining unit 180, whether or not the area in which the wireless communication apparatus 100 is disposed will be changed, and outputs determination results to the updating frequency controller 170. For example, if the area determining unit 190 determines that the area in which the wireless communication apparatus 100 is disposed will be changed, it outputs the determination results (information) indicating that the area will be changed to the updating frequency controller 170.

It is assumed that the first information (e.g., map information) stored in the first-information storage unit 120 is divided and managed in units of areas. In this case, if information indicating that the area in which the wireless communication apparatus 100 is disposed will be changed is received from the area determining unit 190, the updating frequency controller 170 performs control so that the first information stored in the first-information storage unit 120 will be updated. More specifically, the updating frequency controller 170 performs control so that the communication unit 110 will send a request signal for receiving a new version of first information to another information processing apparatus (e.g., a map information providing server). Upon receiving this request signal, the information processing apparatus selects an item of first information concerning a new area contained in the request signal (e.g., map information concerning the new area) from among items of first information (e.g., map information) managed in units of areas, and sends the selected item of first information to the wireless communication apparatus 100. The area determining unit 190 is an example of a determining unit.

The updating information manager 200 stores items of data used for categorizing and managing items of information as first information and second information to be stored in the first-information storage unit 120 and the second-information storage unit 130, respectively. The items of data stored in the updating information manager 200 are updated by the updating frequency controller 170 when necessary. The items of data stored in the updating information manager 200 are also supplied to the updating frequency controller 170 and the communication unit 110. The management content of the updating information manager 200 will be discussed in detail later with reference to FIGS. 2A and 2B. The updating information manager 200 is an example of a manager.

"Example of Management Content of Updating Information Manager"

FIGS. 2A and 2B schematically illustrate management content of the updating information manager 200 of the first embodiment of the present technology. FIGS. 2A and 2B illustrate an example in which the category type of information is changed from that shown in FIG. 2A to that shown in FIG. 2B.

The updating information manager 200 categorizes and manages items of information as first information and second information to be stored in the first and second information storage units 120 and 130, respectively, and also stores items of data used for managing the first and second information. In FIGS. 2A and 2B, for a simple representation, only three items of information, such as map information, a communication carrier name, and a communication rate, are shown as items of information concerning wireless communication.

The updating information manager 200 includes fields, such as identification (ID) information 201, a name 202, an updating interval 203, a latest update time 204, and a category type 205. Items of data of such fields are stored in the updating information manager 200 in association with each other.

The ID information 201 is information for identifying an item of information concerning wireless communication. The name 202 is assigned to an item of information concerning wireless communication.

The updating interval 203 is a value indicating the interval at which an item of information concerning a wireless communication apparatus is updated.

The latest update time 204 is a time at which an item of information concerning a wireless communication apparatus was previously updated.

The category type 205 is information indicating the category type of an item of information, i.e., first information or second information. If the category type 205 indicates "1", the associated item of information is first information. If the category type 205 indicates "2", the associated item of information is second information.

For example, as shown in FIG. 2A, map information (having ID information 201 "M001") in which the category type 205 indicates "1" is categorized as first information. In contrast, as shown in FIG. 2A, the communication carrier name (having ID information 201 "C002") and the communication rate (having ID information 201 "CR03") in which the category type 205 indicates "2" are categorized as second information.

In this case, concerning an item of information (first information) in which the category type 205 indicates "1", an operation for obtaining (e.g., downloading) such an item of information is performed on the basis of the content of the updating interval 203 (e.g., one hour), regardless of the communication quality of a location of the wireless communication apparatus 100.

Concerning an item of information (second information) in which the category type 205 indicates "2", an operation for obtaining (e.g., downloading) such an item of information (second information) is also performed on the basis of the content of the updating interval 203 (e.g., one hour). However, concerning the second information, during an updating interval, an operation for obtaining (e.g., downloading) the second information may be performed at a position at which the communication quality of a location of the wireless communication apparatus 100 satisfies a certain level, or at a time at which the communication quality satisfies a certain level. If the wireless communication apparatus 100 is capable of detecting the congestion level of a base station, an operation for obtaining (e.g., downloading)

the second information may be performed at a location point or time at which the congestion of the base station is lighter. With this operation, it is possible to perform updating processing for second information by restricting a burden imposed on a wireless communication network to a minimal level.

In this manner, the updating frequency controller 170 performs control so that first information and second information will be updated with different frequencies. In this case, the updating frequency controller 170 performs control so that the updating frequency of first information may be lower than that of second information.

"Example of Display Screen of First Embodiment"

FIG. 3 illustrates an example of a display screen (display screen 210) of the display unit 150 according to the first embodiment of the present technology.

The display screen 210 is an example of a display screen when information generated by the information combining unit 140 (superposed information) is displayed on the display unit 150.

For example, in a situation in which the amount of movement of the wireless communication apparatus 100 (the amount of movement of a user owning the wireless communication apparatus 100) is small, background map information is handled as first information to be stored in the first-information storage unit 120. In contrast, items of information concerning the communication rates displayed on the map are handled as second information (i.e., information to be dynamically updated) to be stored in the second-information storage unit 130.

In FIG. 3, an example is shown in which balloon images 211 through 213 containing numeric values indicating communication rates and communication carrier names stored in the second-information storage unit 130 are displayed such that they are superposed on the map. The communication rates stored in the second-information storage unit 130 may be indicated, not by numeric values, but by meters, icons, different colors representing the communication rates.

Not only communication rates, but also information indicating the intensity of a received signal or the signal quality calculated on the basis of the intensity of a received signal and the intensity of an interference signal may be displayed on the map. In this case, all or some of these items of information may be displayed. Such items of information may be indicated by numeric values, meters, icons, different colors.

Additionally, numeric values or expressions obtained by relatively evaluating the congestion of people, vehicles, trains, or stores, information concerning the temperature, humidity, or weather, or information concerning a situation of a certain location point may be displayed as second information on map information.

"Example of Area Determining Processing when Movement Speed is Slow"

FIGS. 4A and 4B illustrate an example of area determining processing performed by the area determining unit 190 according to the first embodiment of the present technology.

FIG. 4A illustrates a simplified association between a map and area information used for area determining processing performed by the area determining unit 190. FIG. 4B illustrates only ID information (coordinates) for identifying individual areas forming the area information shown in FIG. 4A. For example, the ID information (coordinates) of the area disposed at the center of the area information shown in FIG. 4A is "24-35".

It is now assumed that the wireless communication apparatus 100 is positioned at A point (indicated by A in a circle in FIG. 4A) on the map shown in FIG. 4A. It is noted that a position (indicated by, e.g., the latitude and the longitude) at which the wireless communication apparatus 100 is located can be determined on the basis of position information obtained by the position information obtaining unit 180. In this case, the updating frequency controller 170 performs control on the basis of an instruction of the area determining unit 190 so that the map of the area corresponding to the ID information "24-35" will be downloaded. Then, the map of the area corresponding to the ID information "24-35" is downloaded by the communication unit 110 and stored in the first-information storage unit 120.

The area determining unit 190 is able to suitably identify a situation of the movement of the wireless communication apparatus 100, on the basis of position information obtained by the position information obtaining unit 180.

It is now assumed that the wireless communication apparatus 100 will move from A point to B point, as indicated by an arrow 221. In this case, the area determining unit 190 predicts that the wireless communication apparatus 100 will move to an area corresponding to ID information "24-34" (i.e., an area immediately above the area corresponding to "24-35"). Then, the area determining unit 190 instructs the updating frequency controller 170 to download map information concerning the area corresponding to the ID information "24-34". In this case, the map of the area corresponding to the ID information "24-34" is downloaded by using the communication unit 110 and is stored in the first-information storage unit 120.

A description will now be given of criteria for determining timing at which map information of an area adjacent to an area in which the wireless communication apparatus 100 is positioned will be downloaded. For example, when the wireless communication apparatus 100 has reached within a predetermined range (e.g., 500 m) from a boundary between the area in which the wireless communication apparatus 100 is positioned and an adjacent area, it can be determined that map information concerning the adjacent area will be downloaded.

In FIGS. 4A and 4B, for a simple representation, the same item of area information is not contained in a plurality of areas obtained by dividing the map. However, the same item of area information may be contained in areas adjacent to each other. In this case, immediately after the wireless communication apparatus 100 has reached an adjacent area, it can be determined that map information concerning the adjacent area will be downloaded.

Concerning second information stored in the second-information storage unit 130, the updating frequency controller 170 may perform control so that items of second information will be downloaded regularly or irregularly. Concerning first information stored in the first-information storage unit 120, the updating frequency controller 170 may perform control, as shown in FIGS. 4A and 4B, so that items of first information will be downloaded in response to an instruction from the area determining unit 190.

"Example of Area Determining Processing when Movement Speed is Fast"

An example in which the user of the wireless communication apparatus 100 is moving at a relatively slow speed has been discussed with reference to FIGS. 4A and 4B. In contrast, if the user of the wireless communication apparatus 100 is in a bullet train, for example, it can be assumed that the user is moving at a relatively fast speed. An example of an operation for downloading map information when the wireless communication apparatus 100 is moving at a relatively fast speed will be given with reference to FIGS. 5A and 5B.

Figures 5A, 5B:
FIG. 5 illustrates an example of area determining processing performed by the area determining unit according to the first embodiment of the present technology.

FIGS. 5A and 5B illustrate an example of area determining processing performed by the area determining unit 190 according to the first embodiment of the present technology. The association between area information shown in FIGS. 5A and 5B and a map is similar to that shown in FIGS. 4A and 4B, and an explanation thereof will thus be omitted.

It is assumed that the wireless communication apparatus 100 is positioned at C point (indicated by C in a circle in FIG. 5A) on the map shown in FIG. 5A. It is also assumed that the user of the wireless communication apparatus 100 is moving to D point (indicated by D in a circle in FIG. 5A) on the map in a relatively short period of time since the user is in a bullet train. The route of the movement of the wireless communication apparatus 100 is indicated by an arrow 222.

The area determining unit 190 is able to determine the movement speed of the wireless communication apparatus 100 on the basis of position information obtained by the position information obtaining unit 180.

If the obtained movement speed of the wireless communication apparatus 100 is higher than a threshold, the area determining unit 190 may instruct the updating frequency controller 170 to switch the category type of map information from first information to second information.

If the area determining unit 190 may estimate, from the movement speed of the wireless communication apparatus 100, a route through which the wireless communication apparatus 100 will be passing in a short period of time. In this case, if the estimated route is longer than a threshold, the area determining unit 190 may instruct the updating frequency controller 170 to switch the category type of map information from first information to second information.

In this manner, when changing the category type of map information, the updating frequency controller 170 changes the category type 205 of map information from "1" to "2", as shown in FIG. 2B. In this case, the updating interval 203 may be fixed. Alternatively, it may be variable so that it will be overwritten in accordance with an instruction from the area determining unit 190.

With this operation, even when the wireless communication apparatus 100 is moving at a fast speed, appropriate map information corresponding to the movement of the wireless communication apparatus 100 can be suitably displayed on the wireless communication apparatus 100.

"Example of Calculation of Average Value"

Figure 6A:
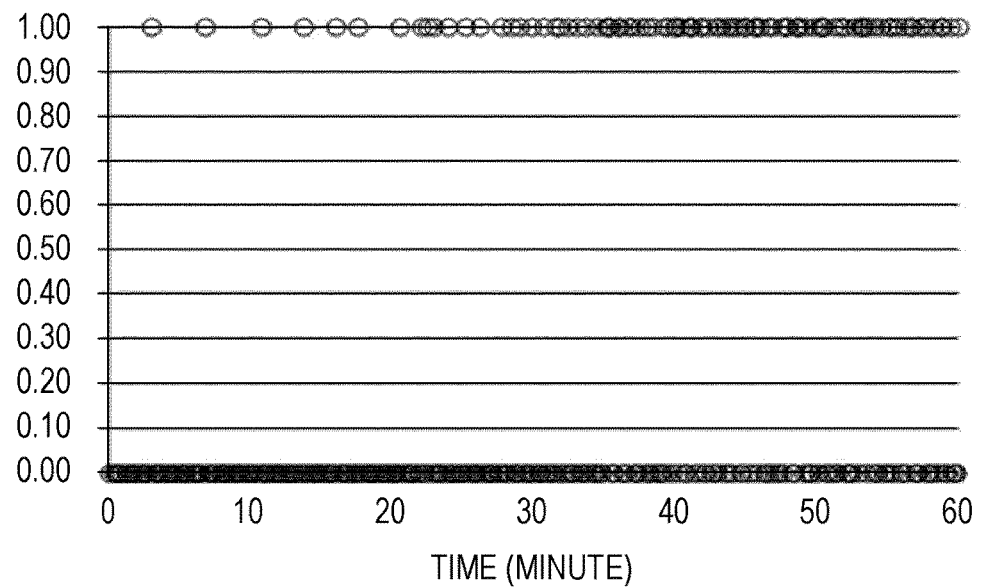
FIG. 6 schematically illustrates an approach to calculating average values by an average value calculator according to the first embodiment of the present technology.
Figure 6B:
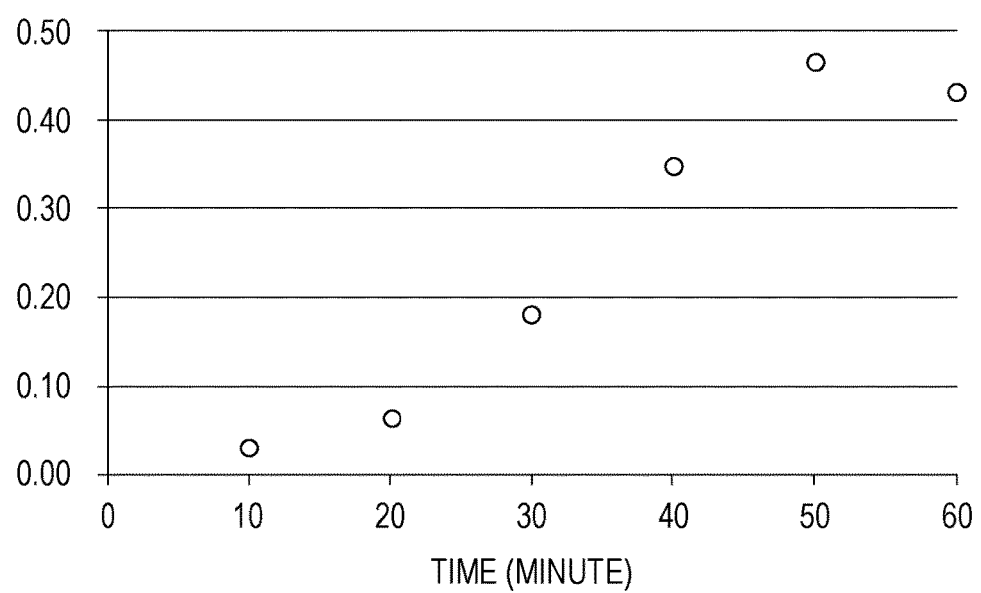

FIGS. 6A and 6B schematically illustrate an approach to calculating average values by the average value calculator 160 according to the first embodiment of the present technology.

In FIG. 6A, "0" s and "1" s are indicated in a time series manner in a case in which the occurrence of a certain phenomenon is indicated by "1" and the non-occurrence of this phenomenon is indicated by "0". In the graph of FIG. 6A, the horizontal axis represents the time axis, and the vertical axis represents the numeric value ("1" or "0") indicating the occurrence or the non-occurrence of a certain phenomenon.

In this example, the vehicle congestion will be quantified, and the passage of a vehicle at a certain location point is considered as the occurrence of a phenomenon. In this case, when a vehicle passes through a certain point, the occurrence of a certain phenomenon is "1", and when a vehicle does not pass through a certain point, the occurrence of a certain phenomenon is "0".

In this case, as shown in FIG. 6A, in a time zone in which vehicles frequently pass, the density of "1" s is high, while in a time zone in which vehicles hardly pass, the density of "0" s is high. Although such time zones can be identified by the graph of FIG. 6A, it is difficult to identify the vehicle congestion as numeric values. If the data items are digitized, the vehicle congestion may be easily identified.

FIG. 6B illustrates average values calculated from the data items shown in FIG. 6A in a time series manner. In FIG. 6B, average values at intervals of ten minutes are calculated by way of example. In the graph of FIG. 6B, the horizontal axis represents the time axis, and the vertical axis represents the average value calculated from the numeric values ("1" and "0") indicating the occurrence and the non-occurrence of a certain phenomenon.

From the calculated average values at intervals of ten minutes shown in FIG. 6B, it can be clearly understood that the vehicle congestion is gradually increasing. In this manner, if average values are calculated by the average value calculator 160, the occurrence and the non-occurrence of a certain phenomenon can be clearly identified.

For example, when the average value is 0.1 or smaller, it can be assumed that there is no vehicle congestion, since hardly any vehicle passes. Accordingly, the updating frequency controller 170 determines that it is not necessary to frequently update second information. In this case, by considering power consumption, the updating frequency controller 170 may decrease the updating frequency of communication resources.

In FIGS. 6A and 6B, average values are calculated for the vehicle congestion. Likewise, average values may also be calculated for the congestion in a train or a store, or the congestion of wireless communication resources in a base station. That is, concerning items of second information stored in the second-information storage unit 130, the average value calculator 160 calculates average values at predetermined time intervals (e.g., ten minutes) according to the information category type. The average value calculator 160 then outputs the calculation results to the updating frequency controller 170.

"Example of Operation of Wireless Communication Apparatus"

Figure 7:
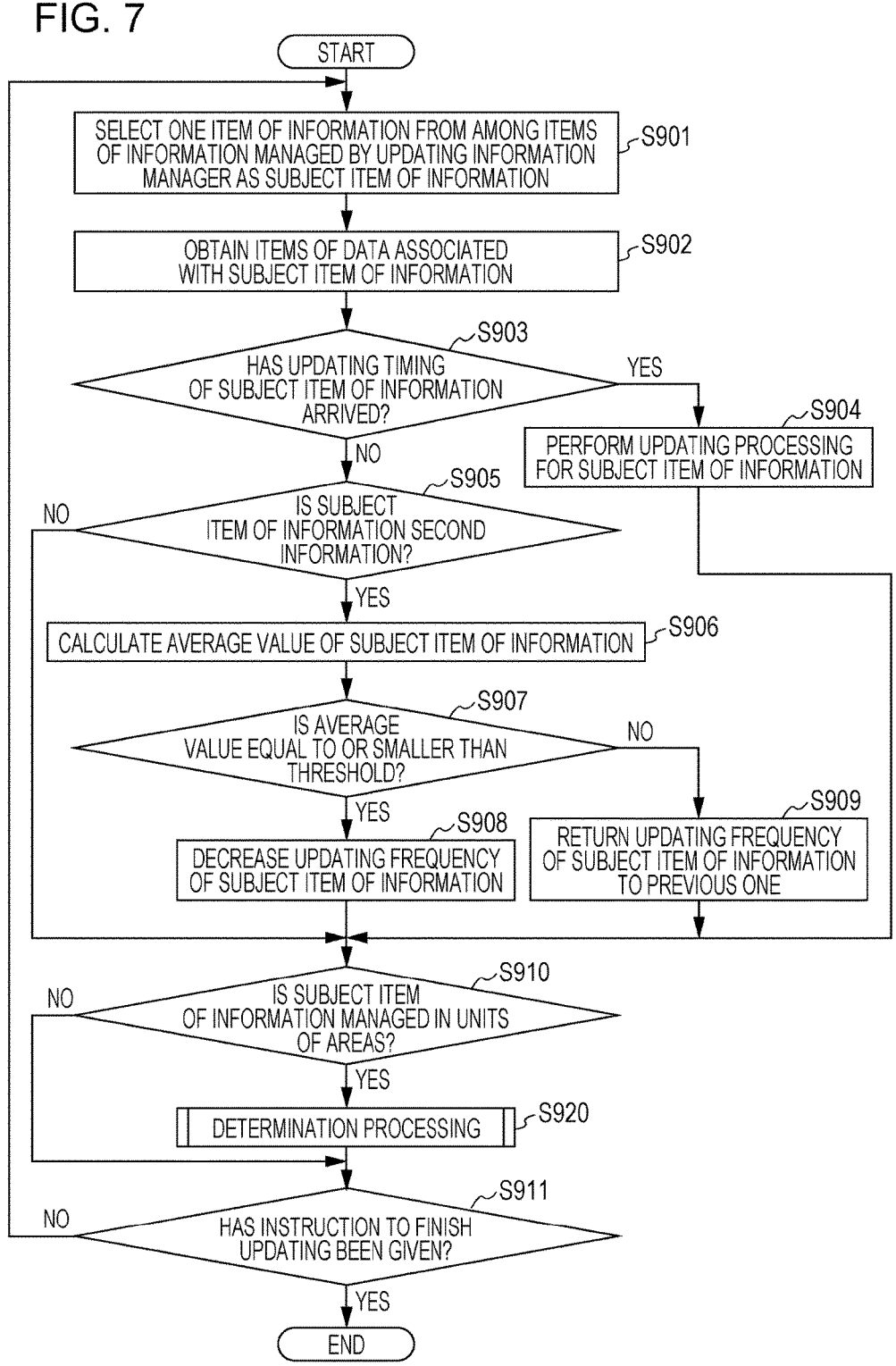
FIG. 7 is a flowchart illustrating an example of a procedure of information updating processing performed by a wireless communication apparatus according to the first embodiment of the present technology.

FIG. 7 is a flowchart illustrating an example of a procedure of information updating processing performed by the wireless communication apparatus 100 according to the first embodiment of the present technology.

First, in step S901, the updating frequency controller 170 selects one item of information from among items of information (first information and second information) managed by the updating information manager 200. The selected item of information will be referred to as a "subject item of information". Then, in step S902, the updating frequency controller 170 obtains items of data associated with the subject item of information. In step S903, the updating frequency controller 170 determines whether the time at which the subject item of information is updated has arrived. For example, it is now assumed that the latest update time 204 (shown in FIGS. 2A and 2B) of the subject item of information is "7:00" and that the updating interval 203 (shown in FIGS. 2A and 2B) is "one hour". In this case, if the current time is "8:00", the updating frequency controller 170 determines that the time at which the subject item of information is updated has arrived.

If it is determined in step S903 that the time at which the subject item of information is updated has arrived, the process proceeds to step S904. In step S904, the updating frequency controller 170 performs updating processing for the subject item of information. For example, the updating frequency controller 170 sends a request to send the subject item of information to a different information processing apparatus, and performs control for obtaining a new version of the subject item of information from the different information processing apparatus.

If it is determined in step S903 that the time at which the subject item of information is updated has not yet arrived, the process proceeds to step S905. In step S905, the updating frequency controller 170 refers to the category type 205 (shown in FIGS. 2A and 2B) and determines whether the subject item of information is second information. If the subject item of information is not second information, the process proceeds to step S910. If the subject item of information is second information, the process proceeds to step S906. In step S906, the updating frequency controller 170 calculates an average value of the subject item of information stored in the second-information storage unit 130.

Then, in step S907, the updating frequency controller 170 determines whether the calculated average value is equal to or smaller than a threshold. If the result of step S907 is YES, the process proceeds to step S908. In step S908, the updating frequency controller 170 decreases the updating frequency of the subject item of information. For example, the updating frequency controller 170 increases the value of the updating interval 203 (shown in FIGS. 2A and 2B). If it is determined in step S207 that the calculated average value is greater than the threshold, the process proceeds to step S909. In step S909, the updating frequency controller 170 returns the updating frequency to the previous one. Step S909 is performed only when the updating frequency of the subject item of information was decreased before. If the updating frequency of the subject item of information was not decreased before, it is not changed. In step S908, the updating frequency may be decreased by degrees. For example, the updating frequency may be sequentially decreased over time.

In step S910, the updating frequency controller 170 determines whether the subject item of information is managed in units of areas. If the result of step S910 is YES, the process proceeds to step S920. In step S920, determination processing is performed. The determination processing will be discussed in detail later with reference to FIG. 8.

It is then determined in step S911 whether an instruction to finish updating has been given. If the result of step S911 is NO, the process returns to step S901. If the result of step S911 is YES, the information updating processing has been completed. Steps S901 through S910 and step S920 form an example of a control procedure.

Figure 8:
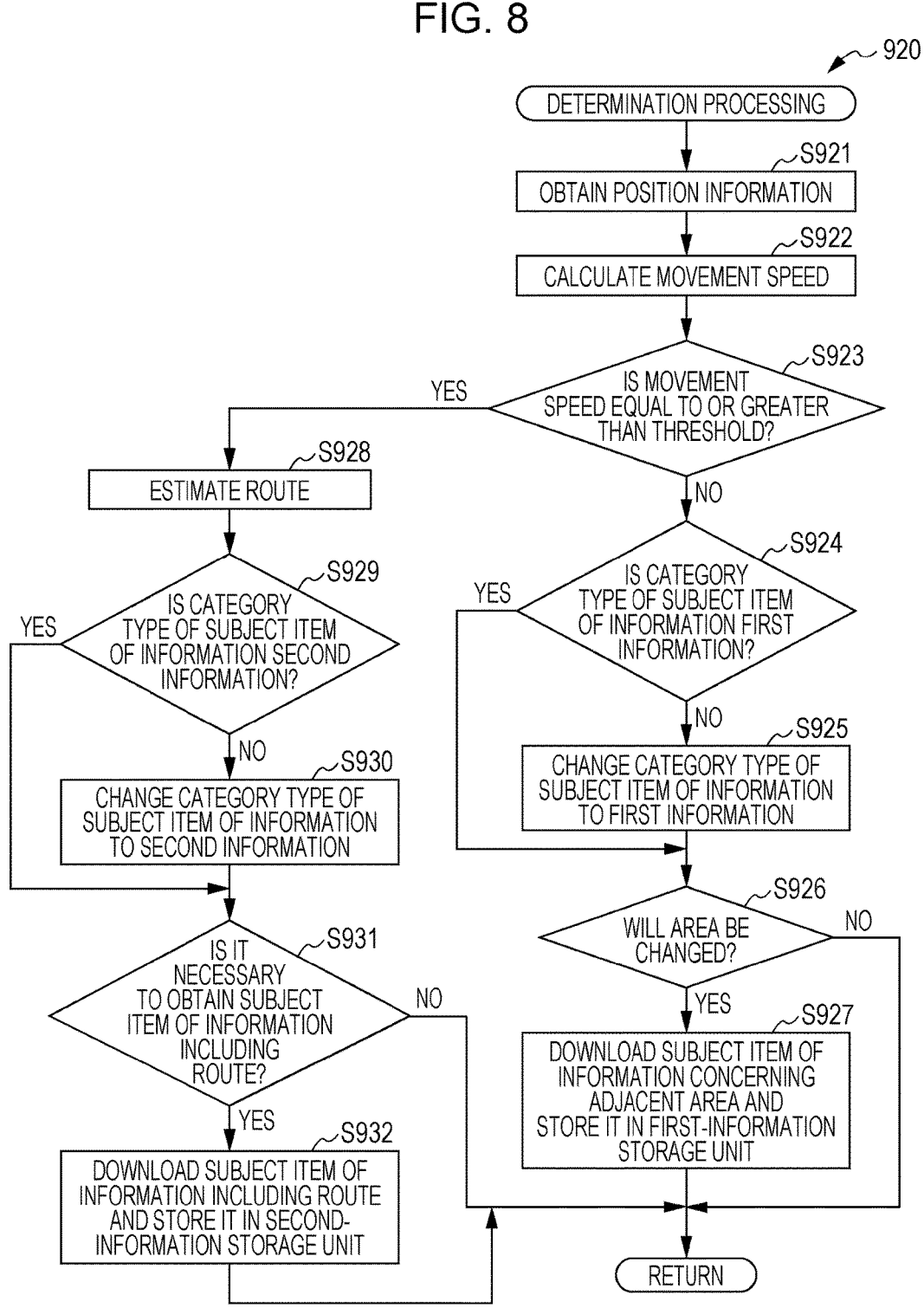
FIG. 8 is a flowchart illustrating determination processing of the procedure of the information updating processing performed by the wireless communication apparatus according to the first embodiment of the present technology.

FIG. 8 is a flowchart illustrating determination processing in step S920 of FIG. 7 of the information updating processing performed by the wireless communication apparatus 100 according to the first embodiment of the present technology.

First, in step S921, the position information obtaining unit 180 obtains position information indicating the position at which the wireless communication apparatus 100 is located. Then, in step S922, the area determining unit 190 calculates the movement speed of the wireless communication apparatus 100 on the basis of the obtained position information. The area determining unit 190 then determines in step S923 whether the calculated movement speed is equal to or greater than a threshold.

If the calculated movement speed is smaller than the threshold, the process proceeds to step S924. In step S924, the updating frequency controller 170 determines whether the category type of the subject item of information is first information. If the subject item of information is not first information, the process proceeds to step S925. In step S925, the updating frequency controller 170 changes the category type of the subject item of information to first information. For example, the category type 205 in the updating information manager 200 is changed from "2" to "1".

Then, in step S926, the area determining unit 190 determines, on the basis of the obtained position information, whether the area in which the wireless communication apparatus 100 is located will be changed. If the area of the wireless communication apparatus 100 will not be changed, the process returns to step S911. If the area of the wireless communication apparatus 100 will be changed, the process proceeds to step S927. In step S927, the updating frequency controller 170 performs control for obtaining the subject item of information concerning an adjacent area. More specifically, the subject item of information concerning an adjacent area is downloaded from another information processing apparatus and is stored in the first-information storage unit 120.

If the area determining unit 190 determines in step S923 that the calculated movement speed is equal to or greater than the threshold, the process proceeds to step S928. In step S928, the area determining unit 190 estimates, from the movement speed, a route through which the wireless communication apparatus 100 will be passing in a short period of time. Then, in step S929, the updating frequency controller 170 determines whether the category type of the subject item of information is second information. If the category type of the subject item of information is not second information, the process proceeds to step S930. In step S930, the updating frequency controller 170 changes the category type of the subject item of information to second information. For example, the category type 205 in the updating information manager 200 is changed from "1" to "2". In this case, for example, the subject item of information is changed from the state shown in FIG. 2A to the state shown in FIG. 2B (indicated by the dotted-line rectangle in FIG. 2B).

Then, in step S931, the area determining unit 190 determines whether it is necessary to obtain the subject item of information including the estimated route. If the result of step S931 is NO, the process returns to step S911 of FIG. 7. If the result of step S931 is YES, the process proceeds to step S932. In step S932, the updating frequency controller 170 performs control for obtaining the subject item of information including the estimated route. More specifically, the subject item of information including the estimated route is downloaded from another information processing apparatus and is stored in the second-information storage unit 130.

With the recent widespread use of smartphones (wireless communication apparatuses), communication traffic is being increased. A device (e.g., a GPS receiver) for detecting position information is installed in most smartphones. Accordingly, applications for sending and receiving geographical information (e.g., map information) between a wireless communication apparatus (e.g., a smartphone) and an information processing apparatus by utilizing wireless communication are coming into wide use. For example, a proposal has been made for collecting items of information related to position information as log information from a wireless communication apparatus and for utilizing such log information as collective intelligence.

With the widespread use of cloud services utilizing smart phones and collective intelligence, communication traffic between a wireless communication apparatus and a server is being increased. Due to such a sharp increase in traffic, various problems have arisen, for example, it is difficult to obtain a sufficient communication rate necessary for providing services in a specific area or at a specific time. With this background, in an embodiment of the present technology, items of geographical information sent and received between a wireless communication apparatus and an information processing apparatus are divided into static information and dynamic information and the two types of information are separately processed, thereby making it possible to reduce communication traffic. That is, it is possible to suitably process geographical information concerning wireless communication.

For example, when the user of a wireless communication apparatus is walking, there may be almost no change in map information displayed on a display unit, and thus, the map information is not frequently updated. That is, the updating frequency of the map information is decreased. However, even when the user is walking, there may be some items of information displayed on a map that may change considerably, and thus, such items of information are frequently updated.

In this manner, in the first embodiment of the present technology, items of information concerning wireless communication are divided into items of information (first information) having static characteristics in which a temporal change is small and items of information (second information) having dynamic characteristics in which a temporal change is large, and two types of information are separately processed. With this arrangement, the updating frequency of information having static characteristics (first information) can be decreased, thereby making it possible to reduce communication traffic.

Additionally, information having static characteristics (first information) is managed in units of areas which are geographically divided. Thus, the first information is appropriately updated in accordance with a change in the area in which a wireless communication apparatus is located. The updating frequency of second information having dynamic characteristics can be controlled in accordance with the quantity of second information. As a result, unnecessary communication traffic does not occur.

Moreover, wireless communication information obtained by separately processing information having static characteristics (first information) and information having dynamic characteristics (second information) can be displayed. This enables a user to easily identify the obtained wireless communication information.

2. Second Embodiment

In the first embodiment of the present technology, items of information concerning wireless communication are categorized and managed according to the type of information (first information and second information), and the timing at which each item of information is updated is changed according to the type of information. There is the following type of communication system. Items of information concerning wireless communication (e.g., second information) are sent to an information processing apparatus from a plurality of wireless communication apparatuses, and the information processing apparatus centrally manages such items of information and provide them to the individual wireless communication apparatuses. In this case, the timing at which information concerning wireless communication (e.g., second information) is sent to the information processing apparatus is an influential factor.

Accordingly, in the second embodiment, the frequency with which second information stored in a wireless communication apparatus is sent to an information processing apparatus is controlled. A wireless communication apparatus in the second embodiment is an apparatus obtained by partially modifying the wireless communication apparatus 100 shown in FIG. 1. Thus, the same elements as those of the wireless communication apparatus 100 are designated by like reference numerals, and part of an explanation thereof will be omitted.

"Example of Functional Configuration of Wireless Communication Apparatus of Second Embodiment"

Figure 9:
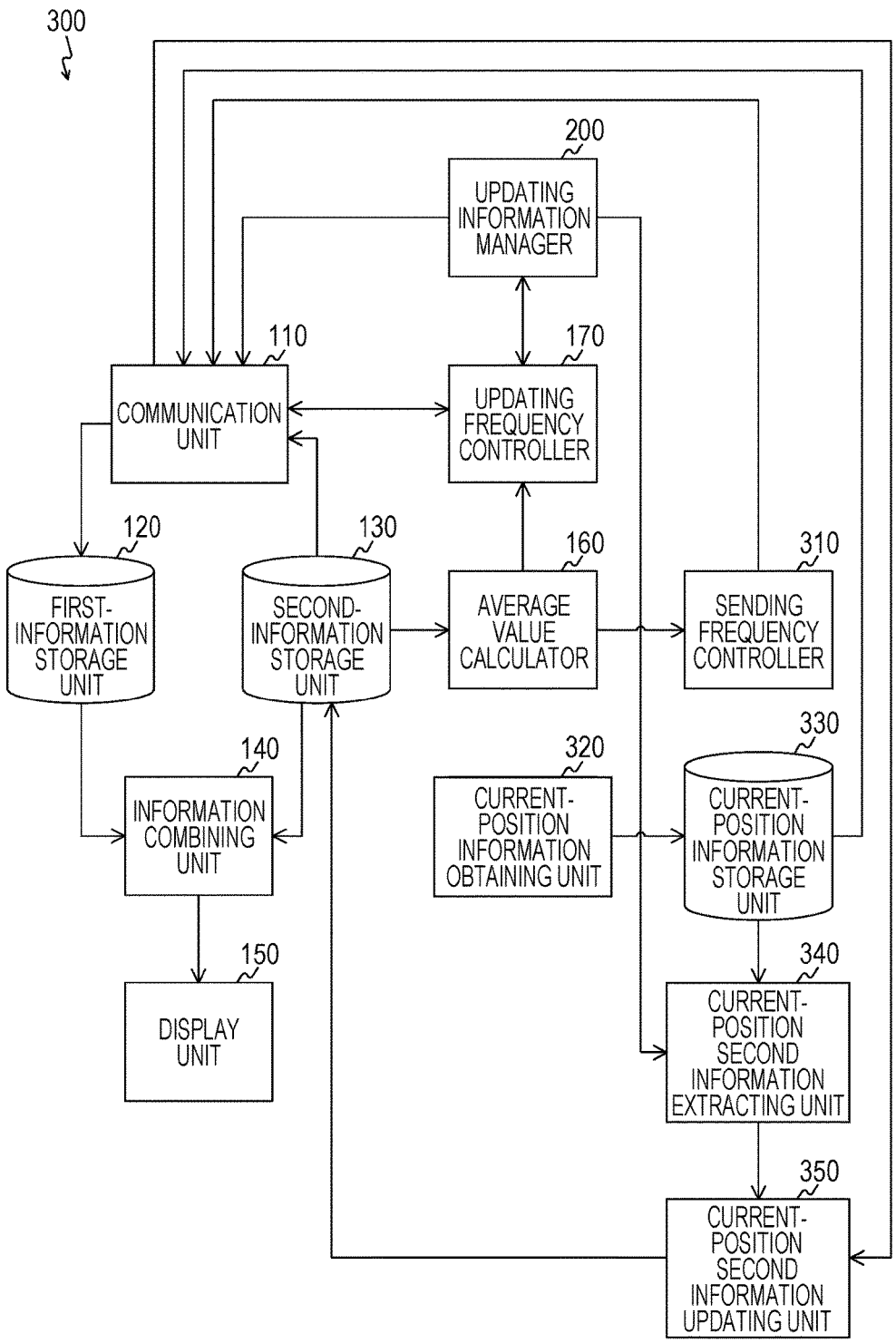
FIG. 9 is a block diagram illustrating an example of the functional configuration of a wireless communication apparatus according to a second embodiment of the present technology.

FIG. 9 is a block diagram illustrating an example of the functional configuration of a wireless communication apparatus 300 according to the second embodiment of the present technology.

The wireless communication apparatus 300 includes a sending frequency controller 310, a current-position information obtaining unit 320, a current-position information storage unit 330, a current-position second-information extracting unit 340, and a current-position second-information updating unit 350.

The communication unit 110 sends second information stored in the second-information storage unit 130 to another information processing apparatus (e.g., a server) (not shown) under the control of the sending frequency controller 310. In the information processing apparatus, items of second information sent from a plurality of wireless communication apparatuses (including the wireless communication apparatus 300) are collected. Then, the information processing apparatus manages collected items of second information and provide them to individual wireless communication apparatuses as collective intelligence.

The sending frequency controller 310 controls the frequency with which second information stored in the second-information storage unit 130 is sent to an information processing apparatus. For example, if an item of second information stored in the second-information storage unit 130 changes by a large degree over time, the sending frequency controller 310 may perform control so that such an item of second information will be sent frequently. If an item of second information stored in the second-information storage unit 130 changes by a small degree over time, the sending frequency controller 310 may perform control so that such an item of second information will not be sent frequently. A determination as to whether or not an item of second information changes by a large degree over time may be made on the basis of a change in values (average values) calculated by the average value calculator 160. For example, in FIG. 6B, a change in the vehicle congestion is small during a time zone from 10 to 20 minutes, and thus, the sending frequency of the numeric values indicating the vehicle congestion detected by the wireless communication apparatus 300 can be decreased. Conversely, a change in the vehicle congestion is large in a certain time zone, such as a time zone from 20 to 30 minutes or from 30 to 40 minutes, and thus, the sending frequency of the numeric values can be increased.

In this manner, when a situation does not change considerably, a user is not likely to find a new item of information useful. In contrast, when a situation changes frequently, the user is likely to find a new item of information useful. Thus, it is desirable that the sending frequency controller 310 controls the sending frequency of a certain item of information on the basis of how much the user finds this item of information useful.

Alternatively, the sending frequency controller 310 may control the sending frequency of an item of second information stored in the second-information storage unit 130 on the basis of the magnitude of a value of such an item of second information. For example, if the value of an item of second information stored in the second-information storage unit 130 is large, the sending frequency controller 310 may perform control so that such an item of second information will be sent frequently. If the value of an item of second information stored in the second-information storage unit 130 is small, the sending frequency controller 310 may perform control so that such an item of second information will not be sent frequently.

A determination as to whether or not the value of an item of second information stored in the second-information storage unit 130 is large may be made on the basis of a change in values (average values) calculated by the average value calculator 160. For example, it is assumed that an item of second information stored in the second-information storage unit 130 indicates the congestion of a road, a train, or a store, or the congestion of wireless allocation resources to base stations. In this case, if the congestion level is not high, a user may not want such an item of second information to be updated frequently. In contrast, if the congestion level is high, a user may want such an item of second information to be updated frequently since the user wishes to know exactly when the congestion will be reduced.

Alternatively, the sending frequency controller 310 may control the sending frequency of an item of second information stored in the second-information storage unit 130 on the basis of the data size of such an item of second information. For example, concerning items of data having a data size of 100 kB or smaller, the sending frequency controller 310 may perform control that such items of data will be sent every ten minutes. Concerning items of data exceeding a data size of 100 kB, the sending frequency controller 310 may perform control that such items of data will be sent every one hour. With this arrangement, it is possible to upload second information to an information processing apparatus (e.g., a server) by restricting a burden imposed on a wireless communication network to a minimal level.

The current-position information obtaining unit 320 obtains various items of information concerning a position (current position) at which the wireless communication apparatus 300 is located. The current-position information obtaining unit 320 may obtain, for example, information indicating a user's subjective opinion input by a user concerning the congestion of a road, a train or a store at a current position. The current-position information obtaining unit 320 may also receive a signal from a certain base station and calculate the occupancy rate of wireless resources of the base station (the congestion level of a base station). Items of information obtained by the current-position information obtaining unit 320 are sequentially stored in the current-position information storage unit 330 as time-series information.

The current-position information storage unit 330 stores therein information obtained by the current-position information obtaining unit 320. Items of information stored in the current-position information storage unit 330 are sent to an information processing apparatus with the frequency instructed by the sending frequency controller 310.

The current-position second-information extracting unit 340 extracts second information (dynamic information components) by removing first information (static information components) from items of information stored in the current-position information storage unit 330.

The current-position second-information extracting unit 340 obtains data (e.g., the category type 205 shown in FIGS. 2A and 2B) managed by the updating information manager 200, checks the obtained data, and then extracts items of second information from items of information stored in the current-position information storage unit 330. The current-position second-information extracting unit 340 then outputs the extracted items of second information to the current-position second-information updating unit 350.

The current-position second-information updating unit 350 reflects the items of second information extracted by the current-position second-information extracting unit 340 in items of second information concerning the current position among items of second information obtained from an information processing apparatus via the communication unit 110. The current-position second-information updating unit 350 stores information (second information) obtained by reflecting the items of second information extracted by the current-position second-information extracting unit 340 in the second-information storage unit 130.

In this case, it is desirable that the frequency with which the current-position information obtaining unit 320 obtains information be higher than the second-information updating frequency set by the updating frequency controller 170. In this manner, by controlling the updating frequency, it is possible to increase the updating frequency of information concerning a current position of the wireless communication apparatus 300 without increasing traffic in performing communication with an information processing apparatus.

As described above, the sending frequency controller 310 is able to perform control so that the frequency with which second information is sent to an information processing apparatus will be changed on the basis of the magnitude of a predetermined value contained in second information.

"Example in which Sending Frequency is Controlled Based on Distance Between Wireless Communication Apparatus and Base Station"

Transmission power consumed in a wireless communication apparatus differs depending on the distance between the wireless communication apparatus and a base station. As the distance between a wireless communication apparatus and a base station is longer, more transmission power is consumed. Accordingly, in the following example, the sending frequency is controlled in accordance with the distance between a wireless communication apparatus and a base station, thereby reducing transmission power consumed in a wireless communication apparatus.

"Example of Functional Configuration of Wireless Communication Apparatus of Modified Example of Second Embodiment"

Figure 10:
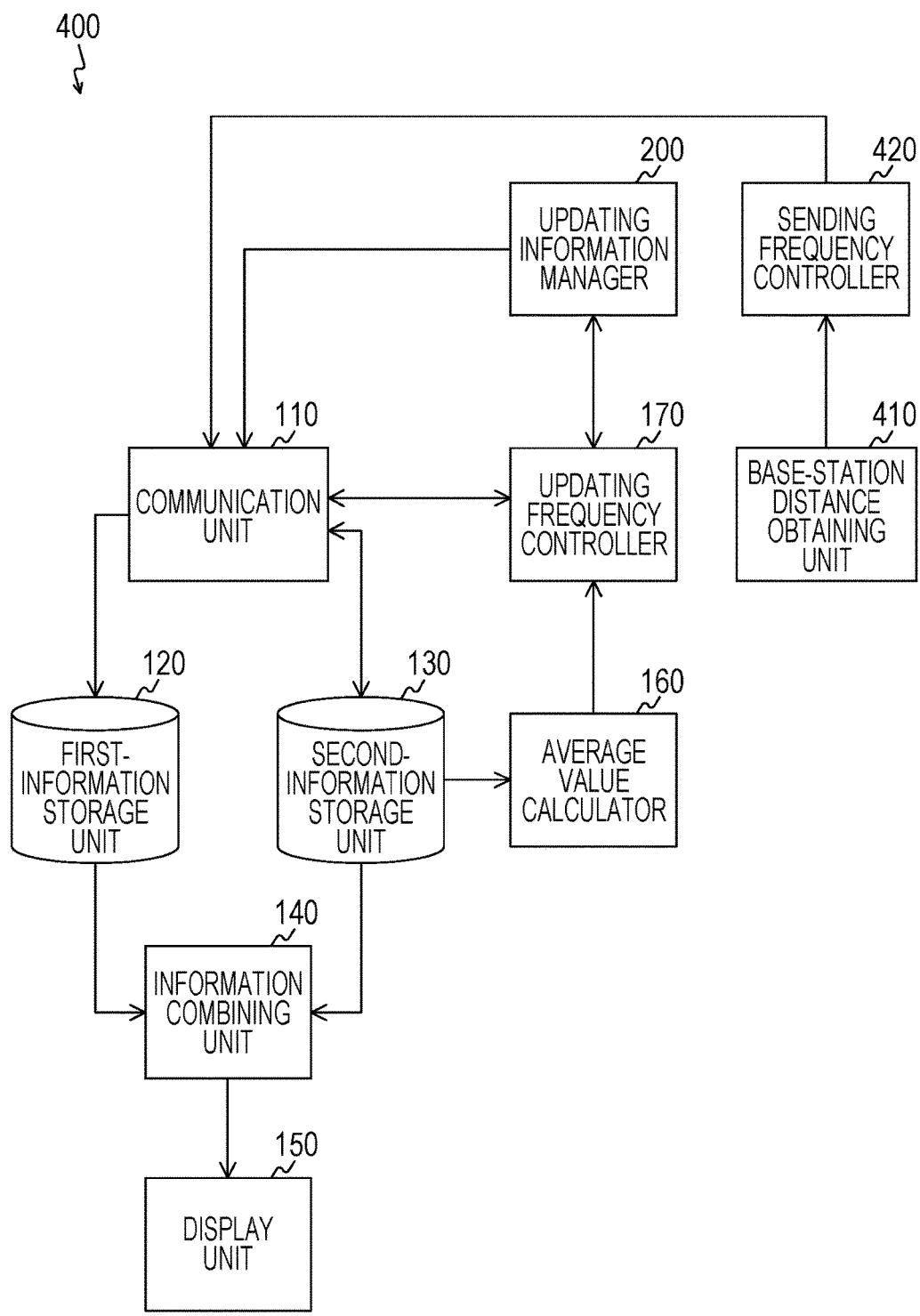
FIG. 10 is a block diagram illustrating an example of the functional configuration of another wireless communication apparatus according to the second embodiment of the present technology.

FIG. 10 is a block diagram illustrating an example of the functional configuration of a wireless communication apparatus 400 according to the second embodiment of the present technology.

The wireless communication apparatus 400 includes a base-station distance obtaining unit 410 and a sending frequency controller 420.

The base-station distance obtaining unit 410 obtains a distance (relative distance) between the wireless communication apparatus 400 and a base station wirelessly connected to the wireless communication apparatus 400, and outputs the obtained distance to the sending frequency controller 420.

The distance (relative distance) between the wireless communication apparatus 400 and a base station wirelessly connected to the wireless communication apparatus 400 may be calculated on the basis of path loss, the reception level of a pilot signal, the signal-to-interference ratio (SIR) of a synchronizing signal, or obtained position information. That is, the base-station distance obtaining unit 410 calculates a distance between the wireless communication apparatus 400 and a base station wirelessly connected to the wireless communication apparatus 400 on the basis of path loss, the reception level of a pilot signal, the SIR of a synchronizing signal, or obtained position information.

The sending frequency controller 420 controls the frequency with which second information stored in the second-information storage unit 130 is sent to an information processing apparatus on the basis of the relative distance obtained by the base-station distance obtaining unit 410. For example, if the relative distance obtained by the base-station distance obtaining unit 410 is equal to or smaller than a first threshold, the sending frequency controller 420 increases the sending frequency. Conversely, if the relative distance obtained by the base-station distance obtaining unit 410 is equal to or greater than a second threshold, the sending frequency controller 420 decreases the sending frequency. In this case, the first threshold is equal to or smaller than the second threshold. That is, the sending frequency controller 420 increases the sending frequency when the distance (relative distance) between the wireless communication apparatus 400 and a base station connected to the wireless communication apparatus 400 is short, and the sending frequency controller 420 decreases the sending frequency when the relative distance is long.

That is, as stated above, when the distance between the wireless communication apparatus 400 and a base station connected to the wireless communication apparatus 400 is short, less transmission power is consumed. In contrast, when the distance between the wireless communication apparatus 400 and a base station connected to the wireless communication apparatus 400 is long, more transmission power is consumed. Accordingly, the frequency with which second information stored in the second-information storage unit 130 is sent to an information processing apparatus by utilizing wireless communication is controlled in accordance with the distance between the wireless communication apparatus 400 and a base station connected to the wireless communication apparatus 400. As a result, power consumed in the wireless communication apparatus 400 can be reduced.

When the distance between the wireless communication apparatus 400 and a base station connected to the wireless communication apparatus 400 is short, the influence of thermal noise or the intensity of an interference signal from an adjacent cell on the intensity of a received signal is small. It is thus possible to obtain high-precision information concerning the communication quality. Thus, the frequency with which second information stored in the second-information storage unit 130 is sent to an information processing apparatus (e.g., a server) is controlled in accordance with the distance between the wireless communication apparatus 400 and a base station connected to the wireless communication apparatus 400, thereby making it possible for a server to collect many items of high-precision information. As a result, it is possible to provide high-precision information to a certain wireless communication apparatus.

In this manner in the second embodiment, the frequency with which information having dynamic characteristics having a large temporal change (second information) is sent to an information processing apparatus (e.g., a server) is controlled. Accordingly, information which is less useful for a user is sent less frequently, thereby reducing communication traffic.

3. Third Embodiment

In the first embodiment, information obtained by combining first information with second information (super-posed information) is displayed on a display unit. A display screen for switching the wireless communication method or contract authentication information may be displayed as superposed information.

Accordingly, in a third embodiment of the present technology, the wireless communication method or contract authentication information may be switched by utilizing a display screen. A wireless communication apparatus in the third embodiment is an apparatus obtained by partially modifying the wireless communication apparatus 100 shown in FIG. 1. Thus, the same elements as those of the wireless communication apparatus 100 are designated by like reference numerals, and part of an explanation thereof will be omitted.

"Example of Functional Configuration of Wireless Communication Apparatus of Third Embodiment"

Figure 11:
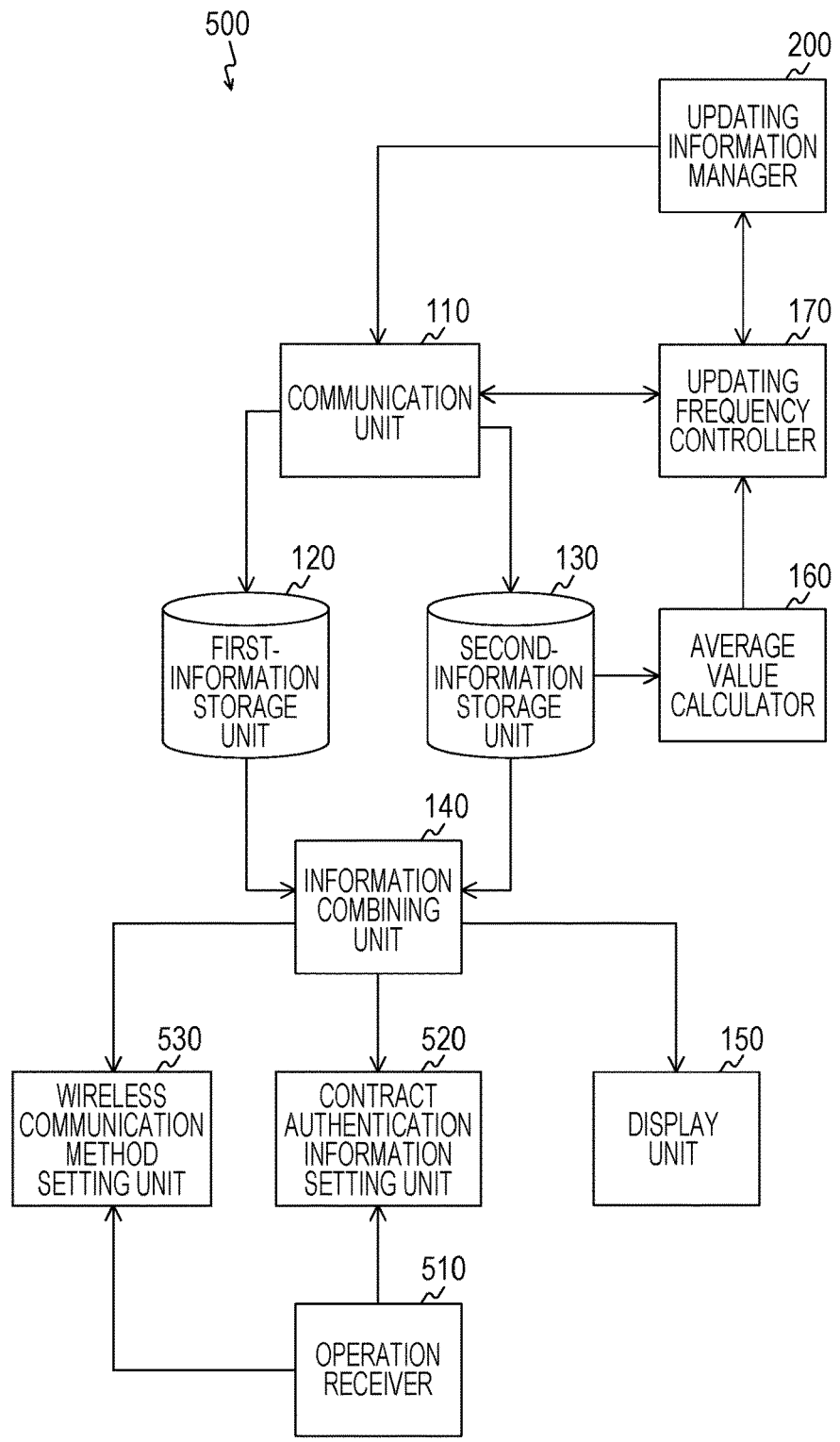
FIG. 11 is a block diagram illustrating an example of the functional configuration of a wireless communication apparatus according to a third embodiment of the present technology.

FIG. 11 is a block diagram illustrating an example of the functional configuration of a wireless communication apparatus 500 according to the third embodiment of the present technology.

The wireless communication apparatus 500 includes an operation receiver 510, a contract authentication information setting unit 520, and a wireless communication method setting unit 530.

As described in the first embodiment, superposed information generated by the information combining unit 140 is displayed on the display unit 150. For example, on the display unit 150, a plurality of wireless communication service names and communication qualities and costs provided by such communication services are displayed. An example of such a display screen is shown in FIGS. 12A and 12B.

The wireless communication service names are not restricted to communication carrier names, but may be communication method names, abbreviations thereof, or trade names thereof. Examples of the communication method names are Global System for Mobile Communications (GSM) (registered trade name), Code Division Multiple Access (CDMA) 2000, Wideband (W)-CDMA, Universal Mobile Telecommunications System (UMTS), High Speed Downlink Packet Access (HSDPA), High Speed Packet Access Plus (HSPA+), Long Term Evolution (LTE), and LTE-Advanced. Abbreviations and trade names of such communication method names may also be used.

Examples of the communication quality are the received power intensity, throughput, transmission speed, SIR, signal-to-noise ratio (SNR), Common Pilot Channel Energy per Chip to Noise Ratio (Ec/No), Common Pilot Channel Energy per Chip to Interference Ratio (Ec/Io). Values converted from numeric values of such indexes may also be used as the communication quality.

As the communication cost, a fee for the provision of a wireless communication service for one time, a communication unit price per packet, or a communication unit price per unit time may be used.

The operation receiver 510 receives an input operation performed by a user, and outputs a signal indicating the content of the input operation received by the operation receiver 510 to the contract authentication information setting unit 520 and the wireless communication method setting unit 530. The operation receiver 510 includes various keys, such as a numeric keyboard and alphabet keys. The operation receiver 510 and the display unit 150 may be integrally formed by using a touch panel which enables a user to input the content of an operation by bringing a finger to contact or close to a display screen of the touch panel. For example, the operation receiver 510 receives the input of a selection operation for selecting one of a plurality of wireless communication services displayed on the display unit 150. In FIGS. 12A and 12B, an example in which a user performs an input operation by using a touch panel is shown.

The contract authentication information setting unit 520 sets contract authentication information so that a wireless communication service selected through the input of a selection operation received by the operation receiver 510 can be utilized.

The contract authentication information is information necessary to connect to a wireless communication network managed by a communication carrier. The contract authentication information includes, for example, telephone subscriber information and authentication key information. The contract authentication information is, for example, Universal Subscriber Identity Module (USIM).

If valid contract authentication information is set in the wireless communication apparatus 500, it means that an access right (rewritable) to connect to a predetermined network (e.g., a public network) by utilizing wireless communication has been set. An access right is a right to connect to a base station run by a communication carrier on the basis of contract authentication information necessary for a user to connect to the base station.

In the third embodiment, USIM is used as contract authentication information. However, the contract authentication information is not restricted to USIM, and another type of contract authentication information may be used. For example, Subscriber Identity Module (SIM) which can be downloaded by using software (e.g., software downloadable SIM) may be utilized. Examples of SIM which can be downloaded by using software are Machine Communication Identity Module (MCIM) and rewritable SIM.

It is now assumed that a USIM card fitting unit to which a plurality of USIM cards are attachable is provided in the wireless communication apparatus 500. In this case, the contract authentication information setting unit 520 switches among multiple USIM cards attached to the USIM card fitting unit so that one of the multiple USIM cards may be valid, thereby setting contract authentication information selected through a selection operation.

It is now assumed that, alternatively, a dedicated memory in which a plurality of items of USIM information are stored by using software is provided in the wireless communication apparatus 500. In this case, the contract authentication information setting unit 520 switches among the plurality of items of USIM information so that only one item of USIM information may be valid and the other items of USIM information may be invalid, thereby setting contract authentication information selected through a selection operation.

It is now assumed that, alternatively, a dedicated memory into which one or a plurality of items of USIM information are written by using software is provided in the wireless communication apparatus 500. In this case, the contract authentication information setting unit 520 receives contract authentication information selected through a selection operation from an information processing apparatus (e.g., a server run by a communication carrier corresponding to the selected contract authentication information). The contract authentication information setting unit 520 then overwrites the content of the dedicated memory by the received contract authentication information, thereby setting contract authentication information.

The wireless communication method setting unit 530 sets a wireless communication method so that a wireless communication service selected through the input of a selection operation received by the operation receiver 510 can be utilized. For example, if a wireless communication service different from a current wireless communication service is selected, the wireless communication method setting unit 530 changes the setting of a wireless communication unit (not shown) so that connection can be made by utilizing a wireless communication method corresponding to the selected wireless communication service.

Examples of the wireless communication method are a CDMA method and an OFDM method. The wireless communication method also includes communication standards, such as GSM, CDMA2000, 1×, EV-DO, W-CDMA, HSDPA, HSPA, HSPA+, LTE, LTE-Advanced, and IEEE802.11a/b/g/n/ac.

"Examples of Display Screen of Third Embodiment"

FIGS. 12A and 12B illustrate examples of a display screen displayed on the display unit 150 of the third embodiment. In FIGS. 12A and 12B, an example in which the wireless communication service (contract authentication information) is switched in response to a user operation is shown.

On the display unit 150, as superposed information generated by the information combining unit 140, a plurality of wireless communication service names and communication qualities provided by such communication services, for example, are indicated on a map 151. For example, on the display unit 150, a plurality of wireless communication service names (two communication carriers (communication carrier A and communication carrier B)) and communication qualities provided by such communication carriers (communication rates (indicated by Mbps)) are displayed on the map 151.

Among the plurality of wireless communication service names (communication carrier A and communication carrier B), a currently set wireless communication service name is indicated in bold type, while the other wireless communication service names are indicated in pale gray. The display content on the map 151 is similar to that shown in FIG. 3, except that a plurality of wireless communication service names are indicated and that a currently set wireless communication service name and the other wireless communication service names are indicated in different display modes.

In this manner, a currently set communication carrier name is visually distinguished from the other communication carrier names displayed on the map 151, thereby allowing a user to easily identify the currently set communication carrier name. On part of the display screen, the currently set communication carrier name may be displayed as characters, an icon, a log, etc. In FIGS. 12A and 12B, the currently set communication carrier name is displayed as characters in a wireless communication service name display region 152 by way of example.

That is, the wireless communication service name display region 152 is a region in which a wireless communication service name corresponding to currently set contract authentication information is displayed.

FIG. 12A shows a display example in which contract authentication information (e.g., USIM) for receiving a communication service of the communication carrier A is set.

For example, in the state shown in FIG. 12A, a user touches a portion corresponding to the communication carrier B (gray character portion within a balloon image) on the map 151. In response to this touching operation, the contract authentication information setting unit 520 performs control for setting contract authentication information necessary to receive a communication service of the communication carrier B. When the contract authentication information for receiving a communication service of the communication carrier B is set in this manner, the display state of the display unit 150 is changed from the state shown in FIG. 12A to the state shown in FIG. 12B.

As described above, in the third embodiment of the present technology, it is possible to easily select a wireless communication service desired by a user by utilizing information displayed on the display unit 150.

In FIGS. 12A and 12B, a user presses a portion of a touch panel corresponding to character information or an icon indicating a communication carrier name (or a communication service name) displayed on the display unit 150, thereby selecting a desired wireless communication service name. Alternatively, by pressing a specific key of a keyboard associated with a communication carrier name or a communication service name, a desired wireless communication service may be selected.

Alternatively, on the basis of information items (e.g., communication quality and cost) included in superposed information generated by the information combining unit 140, one of a plurality of wireless communication services may be automatically selected and set. An example of such a modification is shown in FIG. 13.

"Example of Functional Configuration of Wireless Communication Apparatus of Modified Example of Third Embodiment"

Figure 13:
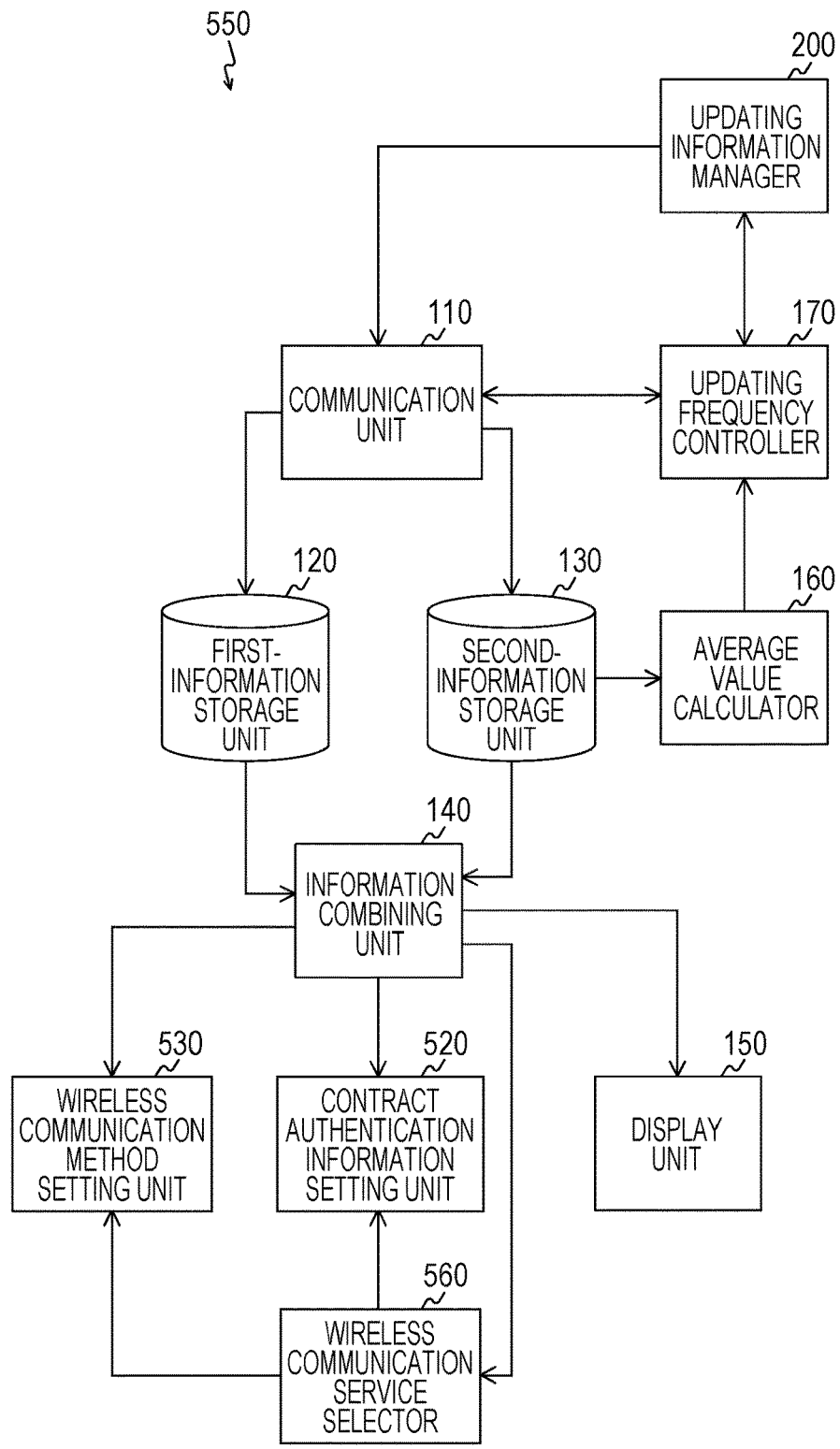
FIG. 13 is a block diagram illustrating an example of the functional configuration of another wireless communication apparatus according to the third embodiment of the present technology.

FIG. 13 is a block diagram illustrating an example of the functional configuration of a wireless communication apparatus 550 according to the third embodiment of the present technology. The wireless communication apparatus 550 shown in FIG. 13 is similar to the wireless communication apparatus 500 shown in FIG. 11, except that a wireless communication service selector 560 is used instead of the operation receiver 510 shown in FIG. 11. Thus, the same elements as those of the wireless communication apparatus 500 are designated by like reference numerals, and part of an explanation thereof will be omitted.

As stated above, the wireless communication service selector 560 is provided in the wireless communication apparatus 550.

The wireless communication service selector 560 automatically selects one of a plurality of wireless communication services on the basis of various items of information (e.g., communication quality and cost) included in superposed information generated by the information combining unit 140. The wireless communication service selector 560 then outputs selection results to the contract authentication information setting unit 520 and the wireless communication method setting unit 530.

For example, the wireless communication service selector 560 selects a wireless communication service which satisfies predetermined conditions set for items of information (e.g., communication quality and cost) included in superposed information generated by the information combining unit 140. The wireless communication service which satisfies predetermined conditions may be a wireless communication service provided by a communication carrier offering the best communication quality in an area in which the wireless communication apparatus 550 is located. The wireless communication service which satisfies predetermined conditions may be a wireless communication service provided by a communication carrier offering the least expensive communication cost in an area in which the wireless communication apparatus 550 is located.

In this manner, the wireless communication service selector 560 is able to automatically select a wireless communication service on the basis of the magnitude of a numeric value of a certain item of information (e.g., communication quality or cost) included in superposed information generated by the information combining unit 140.

The contract authentication information setting unit 520 sets contract authentication information so that the wireless communication service selected by the wireless communication service selector 560 can be utilized. The wireless communication method setting unit 530 sets a wireless communication method so that the wireless communication service selected by the wireless communication service selector 560 can be utilized.

In this manner, the information combining unit 140 generates information concerning one or a plurality of wireless communication services as new information and displays the generated new information on the display unit 150. When one of a plurality of wireless communication services is set, the contract authentication information setting unit 520 or the wireless communication method setting unit 530 performs setting processing for utilizing the selected wireless communication service. Each of the contract authentication information setting unit 520 and the wireless communication method setting unit 530 is an example of a setting unit.

As described above, in the third embodiment of the present technology, by utilizing information concerning wireless communication, a wireless communication service that a user considers optimal can be easily selected. Additionally, by utilizing information concerning wireless communication, a wireless communication service which is considered to be optimal can be automatically selected.

4. Fourth Embodiment

In the first through third embodiments, an example in which the updating frequency or the sending frequency is controlled has been discussed. In this case, a wireless communication apparatus itself determines the updating frequency or the sending frequency. However, the sending frequency in a wireless communication apparatus may be specified by an information processing apparatus.

In a fourth embodiment of the present technology, an example in which the sending frequency in a wireless communication apparatus is specified by an information processing apparatus will be discussed. A wireless communication apparatus in the fourth embodiment is an apparatus obtained by partially modifying the wireless communication apparatus 100 shown in FIG. 1. Thus, the same elements as those of the wireless communication apparatus 100 are designated by like reference numerals, and part of an explanation thereof will be omitted.

"Example of Configuration of Communication System"

Figure 14:
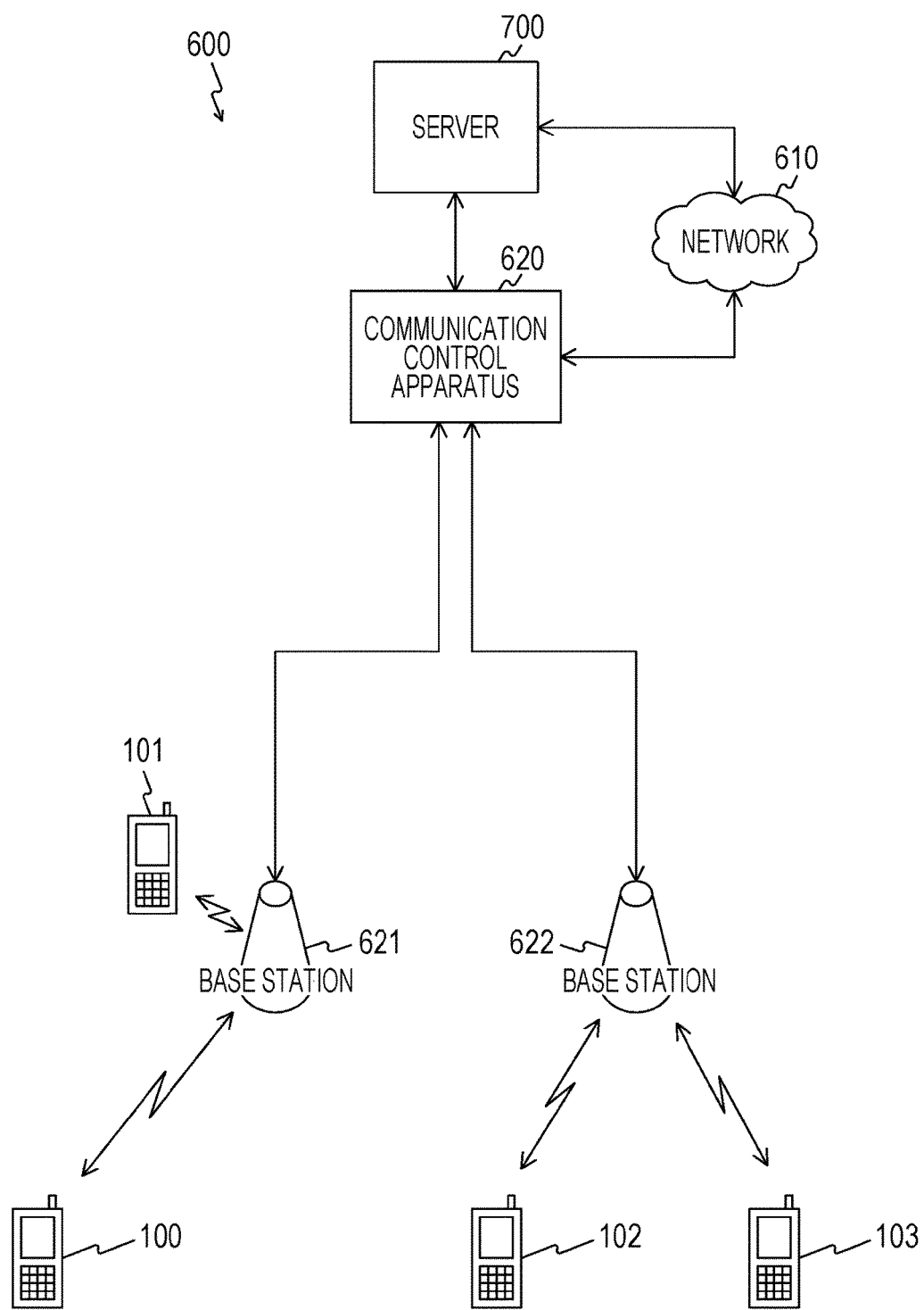
FIG. 14 is a block diagram illustrating an example of the system configuration of a communication system according to a fourth embodiment of the present technology.

FIG. 14 is a block diagram illustrating an example of the system configuration of a communication system 600 according to the fourth embodiment of the present technology.

The communication system 600 includes wireless communication apparatuses 100 through 103, a network 610, a communication control apparatus 620, base stations 621 and 622, and a server 700.

The network 610 is a communication network (e.g., a public network), such as a telephone network, the Internet, etc. The network 610 and the communication control apparatus 620 are connected to each other via a gateway (not shown).

The server 700 is an information processing apparatus which sends and receives various items of information to and from the wireless communication apparatuses 100 through 103 which are connected to the server 700 via the base station 621 or 622 and the communication control apparatus 620. The server 700 may be connected to the communication control apparatus 620 via the network 610.

The server 700 may be managed by, for example, a communication carrier which provides wireless connection services, such as an MVNO.

The communication control apparatus 620 is managed by a communication carrier (e.g., communication carrier A) providing wireless connection services. The communication control apparatus 620 controls the base stations 621 and 622 and performs authentication control of the wireless communication apparatuses 100 through 103 connected to the communication control apparatus 620 via the base station 621 or 622. The communication control apparatus 620 also connects an authenticated wireless communication apparatus with the network 610. The communication carrier is, for example, a mobile network operator, which provides wireless connection services.

The communication control apparatus 620 authenticates only wireless communication apparatuses that possess valid contract authentication information among wireless communication apparatuses connected to the communication control apparatus 620 via the base station 621 or 622, except for a specific case, such as a case in which a call for emergency use (e.g., a call for the police or an ambulance) has been received.

The communication control apparatus 620 sends various items of information received from the wireless communication apparatuses 100 through 103 via the base station 621 or 622 to the server 700. The communication control apparatus 620 also sends various items of information received from the server 700 to the wireless communication apparatuses 100 through 103 via the base station 621 or 622.

Each of the base stations 621 and 622 is run by a communication carrier and is a mobile network base station (Node B or Evolved Node B (eNodeB)) that connects, via a wireless network, the communication control apparatus 620 with the corresponding wireless communication apparatuses 100 through 103 which possess valid contract authentication information supplied from a communication carrier.

The wireless communication apparatuses 100 through 103 are mobile phones (e.g., mobile phones or smartphones having a telephone function and a data communication function) or data communication devices having a wireless communication function (e.g., PCs). The wireless communication apparatuses 100 through 103 are formed similarly to one another. Accordingly, the wireless communication apparatus 100 will be mainly described below, and part of an explanation of the wireless communication apparatuses 101 through 103 will be omitted.

It is assumed that contract authentication information necessary to connect to a wireless communication network managed by a communication carrier (e.g., communication carrier A) which runs the communication control apparatus 620 is set in each of the wireless communication apparatuses 100 through 103 on the basis of a contract agreed upon which the wireless communication apparatuses 100 through 103 have agreed with the communication carrier.

The wireless communication apparatuses 100 through 103 are connected to the base station 621 or 622 via, for example, a wireless network, and are connected to the communication control apparatus 620 via the base station 621 or 622.

Although, only one communication carrier is shown in FIG. 14 for a simple representation, two or more communication carriers may be provided in the communication system 600. Additionally, although only two base stations 621 and 622 are shown in FIG. 14 for a simple representation, three or more base stations run by communication carriers may be provided in the communication system 600.

"Example of Functional Configuration of Communication System"

Figure 15:
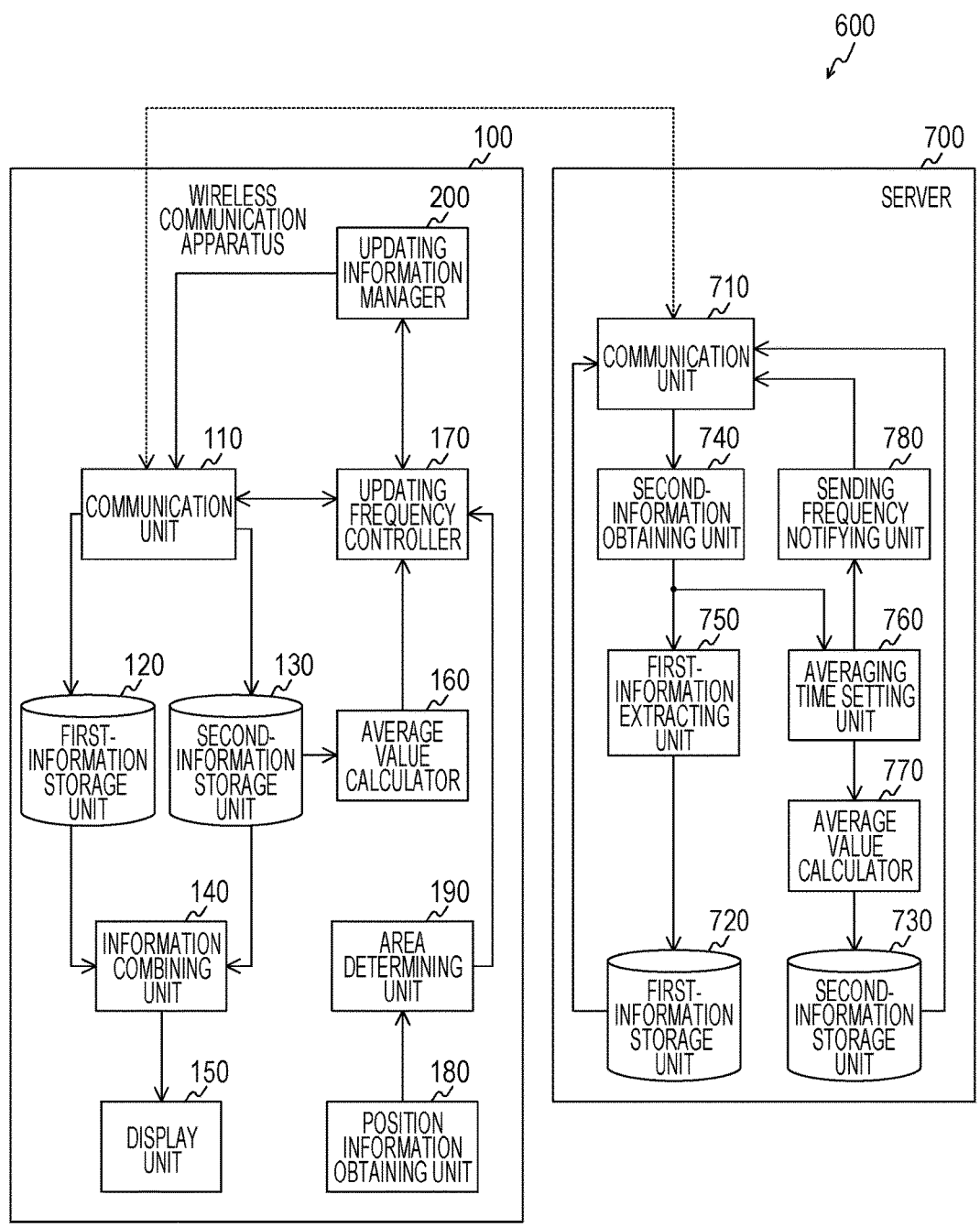
FIG. 15 is a block diagram illustrating an example of the functional configuration of the communication system according to the fourth embodiment of the present technology.

FIG. 15 is a block diagram illustrating an example of the functional configuration of the communication system 600 according to the fourth embodiment of the present technology. The communication system 600 includes the wireless communication apparatus 100 and the server 700.

The server 700 includes a communication unit 710, a first-information storage unit 720, a second-information storage unit 730, a second-information obtaining unit 740, a first-information extracting unit 750, an averaging time setting unit 760, an average value calculator 770, and a sending frequency notifying unit 780.

The communication unit 710 sends and receives various items of information to and from the wireless communication apparatus 100 by utilizing wireless communication. For example, the communication unit 710 outputs information received from the wireless communication apparatus 100 to the second-information obtaining unit 740. The communication unit 710 also notifies the wireless communication apparatus 100 of the sending frequency of second information in response to an instruction from the sending frequency notifying unit 780.

The first-information storage unit 720 stores therein first information (information which concerns wireless communication and which changes by a small degree over time). The second-information storage unit 730 stores therein second information (information which concerns wireless communication and which changes by a large degree over time). That is, information which changes by a small degree over time is stored in the first-information storage unit 720 and is processed, and information which changes by a large degree over time is stored in the second-information storage unit 730 and is processed. The second-information storage unit 730 is an example of a storage unit.

The second-information obtaining unit 740 selects and obtains items of second information from among items of information received from one or a plurality of wireless communication apparatuses (including the wireless communication apparatuses 100 through 103), and outputs the obtained items of second information to the first-information extracting unit 750 and the averaging time setting unit 760.

The first-information extracting unit 750 extracts information having static characteristics (first information) which is contained in the items of second information obtained by the second-information obtaining unit 740, and stores the extracted information (first information) in the first-information storage unit 720.

The first-information extracting unit 750 can extract information having static characteristics (first information) by calculating an average value of items of second information over a sufficiently long period. For example, the first-information extracting unit 750 may calculate a value indicating static characteristics at the same point, such as the intensity of a pilot signal, a reference signal, or a beacon signal received from a base station connected to the wireless communication apparatus 100, or the intensity of interference waves output from a base station located around the wireless communication apparatus 100. Alternatively, the first-information extracting unit 750 may calculate other indexes obtained from these calculated values.

In the second-information storage unit 730, items of information obtained by the second-information obtaining unit 740 may be stored in a time-series manner. Alternatively, an approximate polynomial is calculated for each of certain periods of the time-series information, and the coefficients of the approximate polynomials may be stored as the second information. Alternatively, predictive values for certain periods of the time-series information may be calculated from approximate polynomials and stored as the second information. The predictive values may be values indicating a destination to which a wireless communication apparatus is moved or the congestion of a base station.

Upon receiving a request to send second information from one of the wireless communication apparatuses 100 through 103, the communication unit 710 sends second information stored in the second-information storage unit 730 to the wireless communication apparatus which has sent the request. For example, upon receiving a request to send second information from the wireless communication apparatus 100, the communication unit 710 sends second information stored in the second-information storage unit 730 to the wireless communication apparatus 100. Then, upon receiving the second information from the server 700, the wireless communication apparatus 100 updates the second information stored in the second-information storage unit 130 by the received second information.

The average value calculator 770 calculates average values of items of second information received by the second-information obtaining unit 740, and stores the calculation results (average values) in the second-information storage unit 730.

The averaging time setting unit 760 sets a period for which data samples are averaged by using the average value calculator 770. For example, if the averaging time setting unit 760 causes the average value calculator 770 to calculate an average value every ten minutes, it sets ten minutes as the period for calculation. An approach to setting the averaging time will be discussed in detail later with reference to FIGS. 16A and 16B. The averaging time setting unit 760 is an example of a setting unit.

The sending frequency notifying unit 780 notifies each wireless communication apparatus of the sending frequency of second information via the communication unit 710. For example, if the averaging time setting unit 760 finds that information is obtained from the wireless communication apparatus 100 at intervals which are sufficient to extract characteristics or tendencies of second information, there will be no point of obtaining information more frequently. Accordingly, the sending frequency notifying unit 780 supplies an instruction to decrease the sending frequency to the wireless communication apparatus 100. As a result, it is possible to reduce power consumed in each wireless communication apparatus and communication traffic necessary to send information to the server 700.

An information updating method in the wireless communication apparatus 100 will now be described below.

The wireless communication apparatus 100 updates second information stored in the second-information storage unit 130 by new information received from the server 700.

It is now assumed that map information indicating all areas and static characteristics associated with certain positions of the map information are stored in the first-information storage unit 720 of the server 700. It is also assumed that dynamic characteristics associated with all the areas of the map information are stored in the second-information storage unit 730 of the server 700.

It is also assumed that, in the first-information storage unit 120 of the wireless communication apparatus 100, map information indicating an area in which the wireless communication apparatus 100 is located and areas around the wireless communication apparatus 100, and static characteristics associated with certain positions of the map information indicating these areas are stored. It is also assumed that, in the second-information storage unit 130 of the wireless communication apparatus 100, dynamic characteristics associated with the map information indicating these areas are stored.

The items of information are stored as described above. It is now assumed that the wireless communication apparatus is moved, so that the area in which the wireless communication apparatus 100 is located has been changed. In this case, first information concerning each of areas influenced by this change is updated, and second information concerning each of areas influenced by this change is updated regularly or irregularly.

In this case, the wireless communication apparatus 100 may perform control on the basis of an instruction from the sending frequency notifying unit 780 only when the distance between the wireless communication apparatus 100 and a base station connected to the wireless communication apparatus 100 is equal to or greater than a threshold. The distance to the base station may be calculated similarly to a manner calculated by the base-station distance obtaining unit 410 shown in FIG. 10.

"Example of Setting of Averaging Time"

Figure 16A:
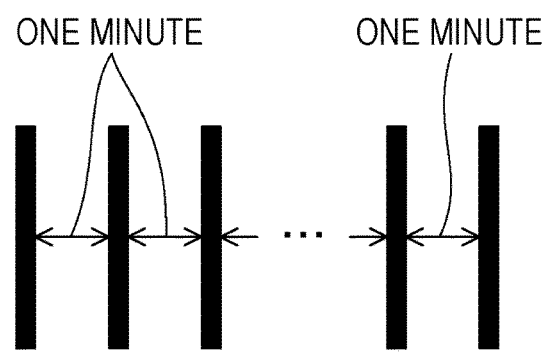
FIG. 16 schematically illustrates the temporal-direction density of the frequency at which a server obtains second information from one or a plurality of wireless communication apparatuses.
Figure 16B:
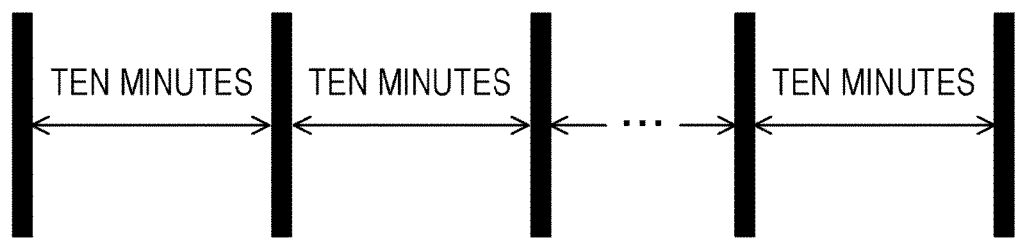

FIGS. 16A and 16B schematically illustrate the temporal-direction density of times at which the server 700 obtains second information from one or a plurality of wireless communication apparatuses. That is, FIGS. 16A and 16B illustrate examples in which the averaging time is set by the averaging time setting unit 760.

FIG. 16A illustrates the temporal-direction density of times at which the server 700 obtains second information from one or a plurality of wireless communication apparatuses every one minute.

When the server 700 obtains second information from one or a plurality of wireless communication apparatuses every one minute, as shown in FIG. 16A, the averaging time setting unit 760 sets, as the averaging time, ten minutes, which is ten times as long as the interval at which second information is obtained (one minute).

FIG. 16B illustrates the temporal-direction density of times at which the server 700 obtains second information from one or a plurality of wireless communication apparatuses every ten minutes.

When the server 700 obtains second information from one or a plurality of wireless communication apparatuses every ten minutes, as shown in FIG. 16B, the averaging time setting unit 760 sets, as the averaging time, one hundred minutes, which is ten times as long as the interval at which second information is obtained (ten minutes).

The average value calculator 770 performs average value calculating processing for extracting characteristics or tendencies of second information, and updates information stored in the second-information storage unit 730. In the case in which second information is obtained every ten minutes, as shown in FIG. 16B, if data samples for ten minutes are averaged, only random characteristics are obtained, thereby making it difficult to extract characteristics or tendencies of the second information. Accordingly, the period for data samples are averaged (average value calculating processing is performed) is varied depending on the interval at which second information is obtained, thereby making it possible to extract appropriate characteristics or tendencies of second information.

In FIGS. 16A and 16B, second information is obtained at regular intervals (one minute and ten minutes, respectively).

However, the above-described average value calculating processing is applicable when second information is obtained irregularly. In this case, for example, intervals at which second information is obtained are averaged, and the obtained average interval is multiplied by a predetermined value (e.g., ten), in which case, the time ten times as long as the average interval is set as the averaging time. In this manner, the averaging time setting unit 760 sets the period for which data samples are averaged on the basis of the temporal-direction density of second information received from a plurality of wireless communication apparatuses. In the second-information storage unit 730, calculated average values of second information are stored as data for updating the second information.

In a situation in which a road or a train is crowded, there may be many users having wireless communication apparatuses. In this situation, therefore, when the server 700 obtains various items of information with a view to providing collective intelligence, it is likely that the server 700 can obtain various items of information from a plurality of wireless communication apparatuses at short intervals. Various items of information collected in the server 700 may be the congestion of a road, a train, or a store, or the occupancy rate of wireless resources of a certain base station (the congestion level of a base station).

In contrast, in a situation in which a road or a train is not crowded, there may be fewer users having wireless communication apparatuses. Accordingly, it is not likely that the server 700 can obtain various items of information from a plurality of wireless communication apparatuses at short intervals. That is, in a more crowded situation, the updating frequency of information stored in the second-information storage unit 730 is increased, while, in a less crowded situation, the updating frequency of information stored in the second-information storage unit 730 is decreased.

Generally, in a more crowded situation, a user may find a change in information concerning such a situation more useful. Accordingly, the averaging time is changed in accordance with the interval at which the server 700 obtains various items of information from a plurality of wireless communication apparatuses, thereby extracting correct characteristics or tendencies of the information. It is thus possible to provide information in response to user's demands.

Additionally, by extracting correct characteristics or tendencies of information, the precision in predicting a future change on the basis of the characteristics or tendencies can be increased.

Second information stored in the second-information storage unit 730 may be provided to wireless communication apparatuses via a wired or wireless medium.

"Example 1 of Sending of Second Information"

Figure 17:
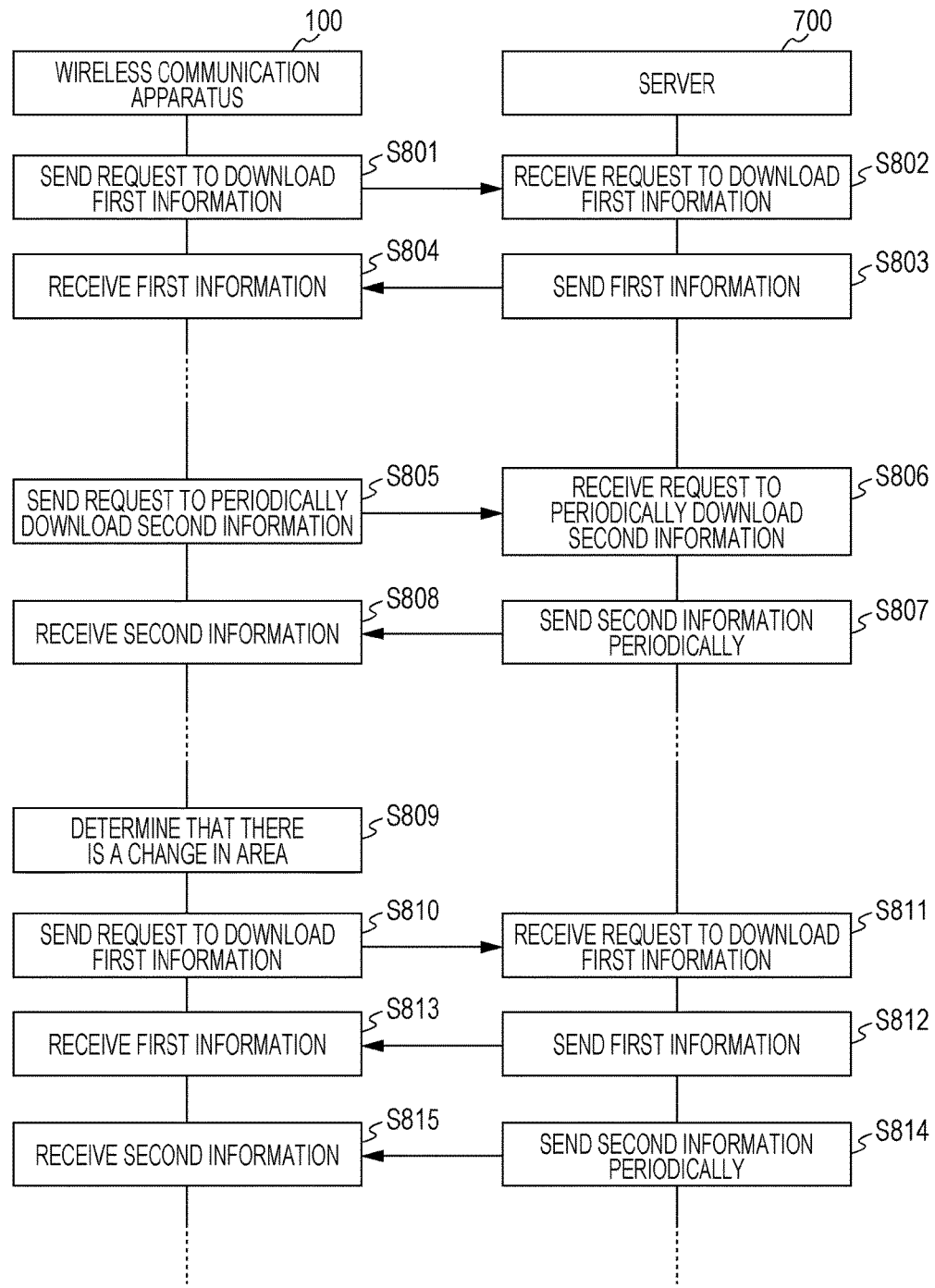
FIG. 17 is a sequence chart illustrating an example of communication processing performed between a wireless communication apparatus and the server forming the communication system of the fourth embodiment of the present technology.

FIG. 17 is a sequence chart illustrating an example of communication processing performed between the wireless communication apparatus 100 and the server 700 forming the communication system 600 according to the fourth embodiment of the present technology. In FIG. 17, an example in which the wireless communication apparatus 100 downloads first information and second information from the server 700 is shown. In FIG. 17, an example in which the updating frequency of first information is controlled depending on whether or not there is a change in the area in which the wireless communication apparatus 100 is located.

The first information is, for example, map information or static information indicating the communication quality concerning wireless communication. The second information is, for example, information concerning vehicle congestion or train congestion dependent on position information or dynamic information indicating the communication quality concerning wireless communication.

First, in steps S801 through S804, the wireless communication apparatus 100 performs downloading processing for first information, which is static information. More specifically, in step S801, the wireless communication apparatus 100 sends a request to download first information to the server 700. In step S802, the server 700 receives this request. Then, in step S803, the server 700 sends the requested first information to the wireless communication apparatus 100. In step S804, the wireless communication apparatus 100 receives the first information.

Subsequently, in steps S805 through S808, the wireless communication apparatus 100 performs periodic downloading processing for second information, which is dynamic information. More specifically, in step S805, the wireless communication apparatus 100 sends a request to periodically download second information to the server 700. In step S806, the server 700 receives this request. Then, in step S807, the server 700 periodically sends the requested second information to the wireless communication apparatus 100. In step S808, the wireless communication apparatus 100 receives the second information. Thereafter, in a manner similar to steps S807 and S808, the second information is periodically sent to the wireless communication apparatus 100 from the server 700, and such steps are not shown in FIG. 17.

In the periodic downloading processing, the wireless communication apparatus 100 may periodically send a request to download second information to the server 700. A request to download second information may be sent to the server 700 irregularly.

In step S809, the wireless communication apparatus 100 determines regularly or irregularly whether or not there is a change in the area in which the wireless communication apparatus 100 is located. If it is determined in step S809 that there is a change in the area, it is necessary to update the first information. Then, in steps S810 through S813, the wireless communication apparatus 100 performs downloading processing for first information in a manner similar to steps S801 through S804, respectively.

Thereafter, in steps S814 and S815, second information is periodically sent to the wireless communication apparatus 100 from the server 700. The subsequent steps are not shown in FIG. 17.

"Example 2 of Sending of Second Information"

Figure 18:
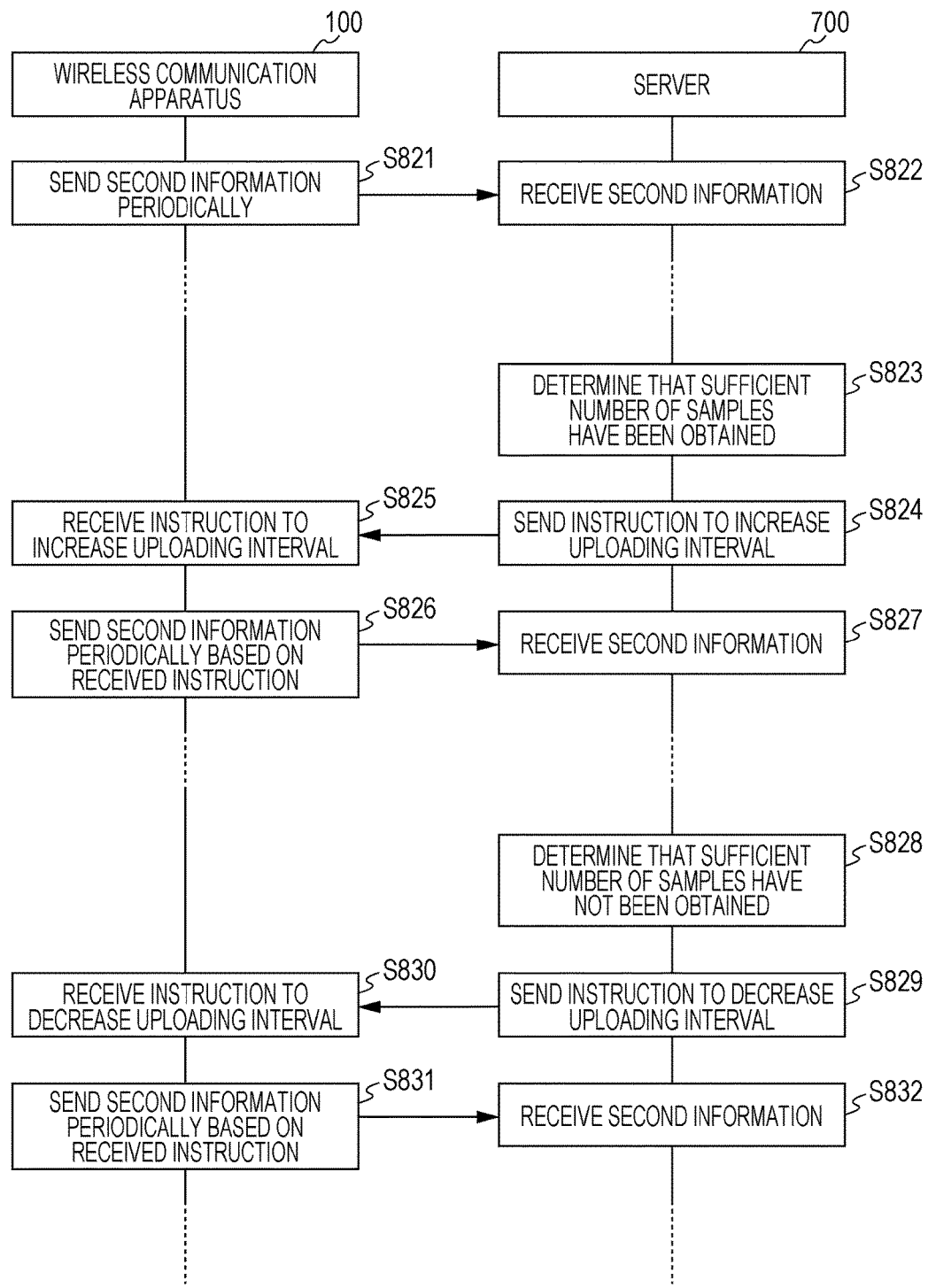
FIG. 18 is a sequence chart illustrating an example of communication processing performed between a wireless communication apparatus and the server forming the communication system of the fourth embodiment of the present technology.

FIG. 18 is a sequence chart illustrating an example of communication processing performed between the wireless communication apparatus 100 and the server 700 forming the communication system 600 according to the fourth embodiment of the present technology. In FIG. 18, an example in which second information obtained by the wireless communication apparatus 100 is uploaded to the server 700 is shown. In FIG. 18, an example in which the sending frequency is controlled depending on whether or not a sufficient number of samples to perform averaging have been obtained is shown.

First, in step S821, the wireless communication apparatus 100 sends second information to the server 700 regularly or irregularly. In step S822, the server 700 obtains second information from a plurality of wireless communication apparatuses (including the wireless communication apparatus 100). Thereafter, in a manner similar to steps S821 and S822, second information is periodically sent from a plurality of wireless communication apparatuses to the server 700, but such steps are not shown in FIG. 18.

In step S823, the server 700 determines regularly or irregularly whether or not a sufficient number of samples to perform averaging have been obtained. If it is determined in step S823 that a sufficient number of samples to perform averaging has been obtained, in step S824, the server 700 supplies instruction to increase the uploading interval to a plurality of wireless communication apparatuses (including the wireless communication apparatus 100). Then, in step S825, the wireless communication apparatus 100 receives this instruction. In step S826, the wireless communication apparatus 100 sends second information at longer intervals to the server 700. In step S827, the server 700 receives the second information. Thereafter, in a manner similar to steps S826 and S827, second information is periodically sent from a plurality of wireless communication apparatuses to the server 700, but such steps are not shown in FIG. 18.

A determination as to whether a sufficient number of samples to perform averaging have been obtained may be made by determining whether the number of samples is equal to or greater than a threshold. As the threshold, the average number of data items for ten-minute intervals may be used (e.g., 200).

In step S828, the server 700 also determines regularly or irregularly whether or not a sufficient number of samples to perform averaging have been obtained. If it is determined in step S828 that a sufficient number of samples to perform averaging have not been obtained, in step S829, the server 700 supplies an instruction to decrease the uploading interval to a plurality of wireless communication apparatuses (including the wireless communication apparatus 100). Then, in step S830, the wireless communication apparatus 100 receives this instruction. In step S831, the wireless communication apparatus 100 sends second information at shorter intervals to the server 700. In step S832, the server 700 receives the second information. Thereafter, in a manner similar to steps S831 and S832, second information is periodically sent from a plurality of wireless communication apparatuses to the server 700, but such steps are not shown in FIG. 18.

"Example of Operation of Server"

Figure 19:
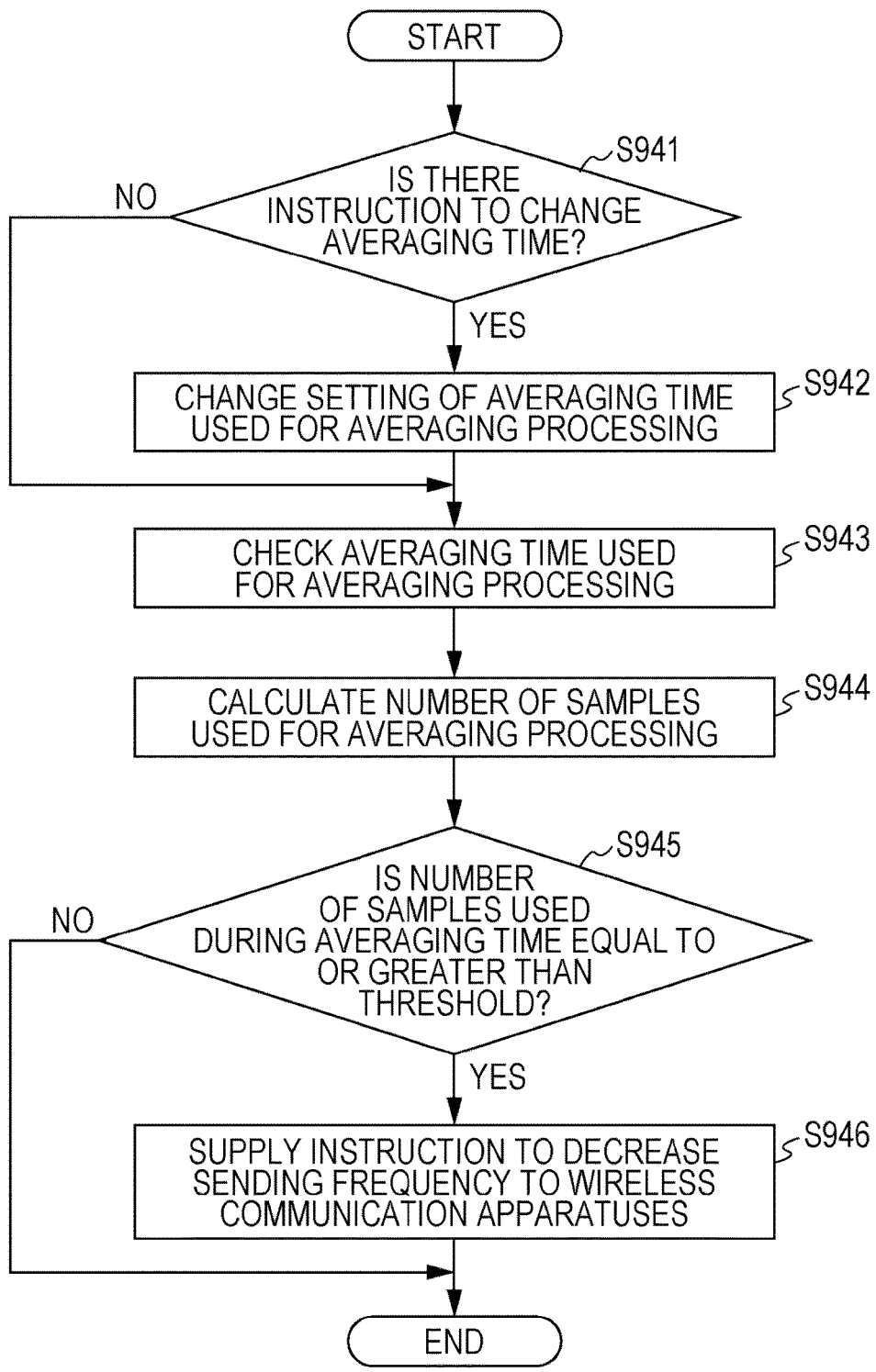
FIG. 19 is a flowchart illustrating an example of sending frequency instruction processing executed by the server according to the fourth embodiment of the present technology.

FIG. 19 is a flowchart illustrating an example of sending frequency instruction processing executed by the server 700 according to the fourth embodiment of the present technology. This processing is executed regularly or irregularly.

First, in step S941, the average value calculator 770 determines whether there is an instruction to change the averaging time from the averaging time setting unit 760. If the result of step S941 is YES, the process proceeds to step S942. In step S942, the average value calculator 770 changes the setting of the averaging time used for averaging processing.

Then, in step S943, the sending frequency notifying unit 780 checks the averaging time used for averaging processing. In step S944, the sending frequency notifying unit 780 then calculates the number of samples subjected to averaging processing. Then, in step S945, the sending frequency notifying unit 780 determines whether the number of samples used during the averaging time is equal to or greater than a threshold. If the result of step S945 is NO, the sending frequency instruction processing is terminated. If the result of step S945 is YES, the process proceeds to step S946. In step S946, the sending frequency notifying unit 780 supplies an instruction to decrease the sending frequency to each of the wireless communication apparatuses.

In the example shown in FIG. 19, when the number of samples used during the averaging time is equal to or greater than the threshold, an instruction to decrease the sending frequency is supplied to each of the wireless communication apparatuses. As stated above, if the distance between a wireless communication apparatus and a base station connected to the wireless communication apparatus is relatively short, loads, such as transmission power and communication traffic, are relatively small. Accordingly, an instruction to decrease the sending frequency may be supplied only to wireless communication apparatuses on which a relatively heavy load is imposed (the distance to a base station is relatively long). An example of such a case is shown in FIG. 20.

Figure 20:
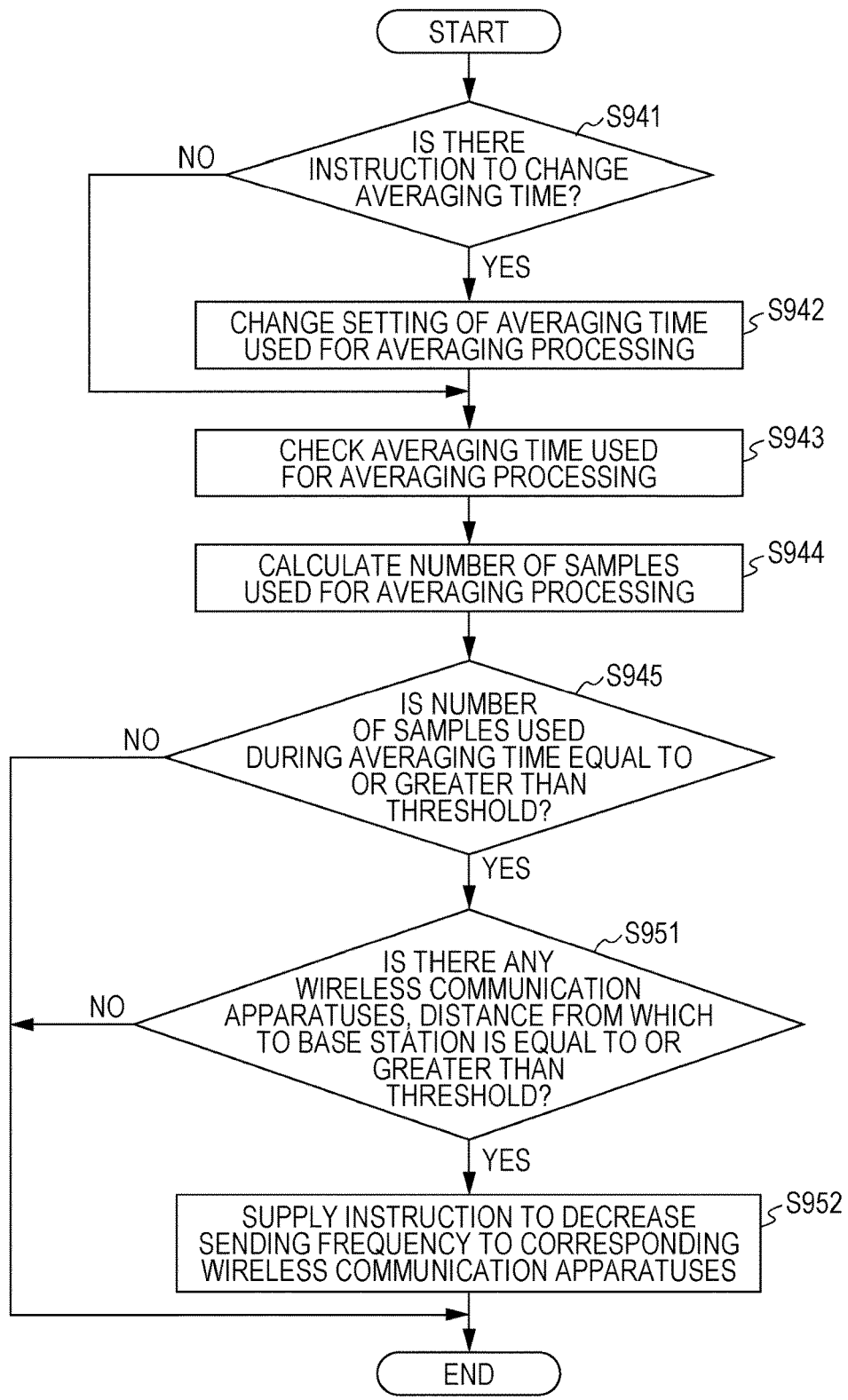
FIG. 20 is a flowchart illustrating another example of sending frequency instruction processing executed by the server according to the fourth embodiment of the present technology.

FIG. 20 is a flowchart illustrating an example of sending frequency instruction processing executed by the server 700 according to the fourth embodiment of the present technology. The processing shown in FIG. 20 is a modification of the processing shown in FIG. 19. Accordingly, the same steps as those shown in FIG. 19 are designated by like step numbers, and part of an explanation thereof will be omitted.

If it is determined in step S945 that the number of samples used during the averaging time is equal to or greater than a threshold, the process proceeds to step S951. In step S951, the sending frequency notifying unit 780 determines whether there is any wireless communication apparatus, the distance from which to a base station connected to the wireless communication apparatus is equal to or greater than a threshold. In this case, information concerning the distance to a base station is included in information sent from each wireless communication apparatus to the server 700, and the above-described determination can be made on the basis of this information.

If the result of step S951 is NO, the sending frequency instruction processing is terminated. If the result of step S951 is YES, the process proceeds to step S952. In step S952, the sending frequency notifying unit 780 supplies an instruction to decrease the sending frequency to the corresponding wireless communication apparatuses.

As described above, the sending frequency notifying unit 780 of the server 700 determines the sending frequency with which a wireless communication apparatus sends second information to the server 700, on the basis of the number of samples used during a set interval for calculating an average value, and notifies the wireless communication apparatus of the determined sending frequency. Then, the wireless communication apparatus sends second information managed in the wireless communication apparatus to the server 700 on the basis of the sending frequency received from the server 700. Instead of executing step S951 by the server 700, a wireless communication apparatus may determine whether the distance between the wireless communication apparatus and a base station connected to the wireless communication apparatus is equal to or greater than the threshold. Then, only when the distance to the base station is equal to or greater than the threshold, may the wireless communication apparatus decrease the sending frequency in response to an instruction from the server 700.

"Example in which Sending Frequency is Controlled in Accordance with Position Information Precision"

Transmission power differs depending on the precision of position information. When the precision is higher, the precision in averaging processing by the server 700 becomes higher, and when the precision is lower, the precision in averaging processing by the server 700 becomes lower. Accordingly, in the following example, the sending frequency is controlled in accordance with the precision of position information, thereby improving the precision in averaging processing and reducing transmission power necessary for performing wireless communication.

"Example of Functional Configuration of Wireless Communication Apparatus of Fourth Embodiment"

Figure 21:
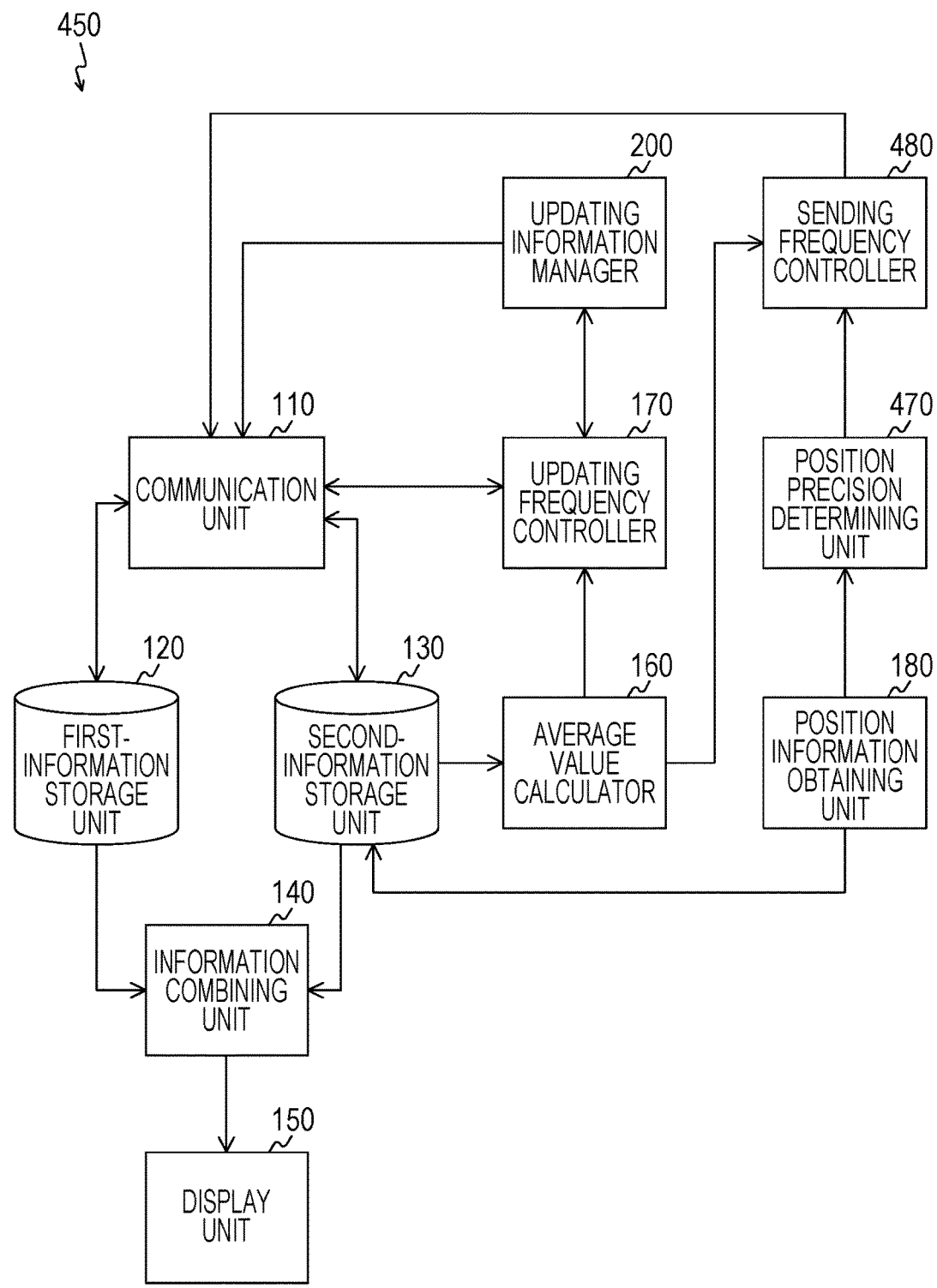
FIG. 21 is a block diagram illustrating an example of the functional configuration of another wireless communication apparatus according to the fourth embodiment of the present technology.

FIG. 21 is a block diagram illustrating an example of the functional configuration of a wireless communication apparatus 450 according to the fourth embodiment of the present technology. The wireless communication apparatus 450 shown in FIG. 21 is an apparatus obtained by partially modifying the wireless communication apparatus 100 shown in FIG. 15. Thus, the same elements as those of the wireless communication apparatus 100 are designated by like reference numerals, and part of an explanation thereof will be omitted.

The wireless communication apparatus 450 includes the position information obtaining unit 180, a position precision determining unit 470, and a sending frequency controller 480.

The position information obtaining unit 180 obtains information (position information) concerning a position at which the wireless communication apparatus 100 is located, and outputs the obtained position information to the position precision determining unit 470.

The position precision determining unit 470 determines the precision of the position information obtained by the position information obtaining unit 180 if second information to be stored in the second-information storage unit 730 is associated with the obtained position information. The position precision determining unit 470 then outputs determination results to the sending frequency controller 480.

If the position precision determining unit 470 has determined that the precision of the position information obtained by the position information obtaining unit 180 is equal to or greater than a threshold, the sending frequency controller 480 performs control so that second information associated with the position information will not be sent to the server 700.

The threshold for determining the precision of position information may be changed in accordance with the resolution of second information. For example, if second information (information associated with position information) varies with a resolution of several tens of meters, a threshold having a precision of at least ten-meter units is necessary. If second information (information associated with position information) varies with a resolution of several kilometers, a threshold having a precision of at least kilometer units is necessary.

In this manner, the sending frequency controller 480 controls the sending frequency in accordance with the precision of position information determined by the position precision determining unit 470. This makes it possible to improve the precision used for averaging samples obtained from a plurality of wireless communication apparatuses by the server 700. Additionally, it is possible to reduce wireless communication traffic between a wireless communication apparatus and the server 700.

In an embodiment of the present technology, items of information are categorized as first information and second information in accordance with a degree by which an item of information changes over time. However, items of information may be categorized into three or more types and managed. For example, items of information having static characteristics in which a temporal change is small are categorized as first information, and items of information having dynamic characteristics in which a temporal change is large are categorized as second information. Additionally, items of information having a degree of temporal change between that of the first information and that of the second information may be categorized as third information and managed. In this case, the updating frequency of the third information may be about an intermediate value between that of the first information and that of the second information.

In an embodiment of the present technology, management of first information and second information and control of the updating frequency of the first and second information are performed by a wireless communication apparatus. However, if there is any processing that can be performed by an information processing apparatus (e.g., management and control of first information and second information), an information processing apparatus may perform such processing. Moreover, if there is any processing that can be performed by an information processing system disposed in a network (e.g., management and control of first information and second information), an information processing system may perform such processing. In such cases, for example, a wireless communication apparatus performs processing (management and control of first information and second information) under the control of, for example, an information processing apparatus by utilizing wireless communication. That is, an information processing apparatus includes a manager that manages items of information concerning wireless communication which are managed in a wireless communication apparatus by categorizing the items of information into first information and second information in accordance with a degree by which an item of information changes over time. The information processing apparatus also performs control for a wireless communication apparatus so that first information and second information may be updated with different frequencies. An information processing system disposed in a network is a system including one or a plurality of apparatuses, and cloud computing is assumed as such an information processing system.

In an embodiment of the present technology, an integrally formed information processing apparatus (e.g., the server 700) has been discussed by way of example. However, an embodiment of the present technology may be applicable to an information processing system including the individual elements forming the information processing apparatus as individual apparatuses forming the information processing system. An embodiment of the present technology may also be applicable to mobile wireless communication apparatuses (e.g., terminal apparatuses dedicated to data communication) other than mobile phones and to fixed wireless communication apparatuses (e.g., wireless communication apparatuses specially used for collecting data of vending machines).

In an embodiment of the present technology, new information (third information) generated as a result of the information combining unit 140 combining items of information is displayed on a display unit. However, such new information (third information) may be output from a sound output unit (e.g., a speaker) of a wireless communication apparatus. Additionally, information concerning, for example, a base station, may be output from an electronic apparatus (e.g., an external sound output apparatus or an external display apparatus) connected to a wireless communication apparatus. In this case, a wireless communication apparatus sends third information to an electronic apparatus and the electronic apparatus outputs the third information.

The above-described embodiments are examples for realizing the present technology, and the elements in the embodiments and the corresponding elements in the claims are associated with each other. Similarly, the elements in the claims and the elements in the embodiments designated by the same names as those in the claims are associated with each other. However, the present technology is not restricted to the disclosed embodiments, and various modifications may be made to the embodiments without departing from the spirit of the present technology.

The processing steps discussed in the above-described embodiments may be identified as a method including this series of steps, or as at least one tangible, non-transitory computer readable storage medium storing at least one program, comprising processor-executable instructions that, when executed by at least one processor, cause the at least one processor to perform the series of steps. As such a recording medium, a hard disk, a compact disc (CD), a mini disc (MD), a digital versatile disk (DVD), a memory card, a Blu-ray Disc (registered trademark), etc., may be used.

Additionally, the present technology may be configured as follows.

(1)

An information processing apparatus including:

a manager that manages items of information concerning wireless communication managed in a wireless communication apparatus by categorizing the items of information into first information and second information in accordance with a degree by which an item of information changes over time; and a controller that performs control so that the first information and the second information will be updated with different frequencies.

(2)

The information processing apparatus according to (1), wherein the manager manages the items of information concerning wireless communication by categorizing items of information having static characteristics in which the items of information change by a small degree over time as the first information and items of information having dynamic characteristics in which the items of information change by a large degree over time as the second information.

(3)

The information processing apparatus according to (2), wherein the controller performs control so that the first information will be updated less frequently than the second information.

(4)

The information processing apparatus according to (2) or (3), wherein:

the information processing apparatus is the wireless communication apparatus;

the first information is managed in units of geographical areas;

the wireless communication apparatus further includes a position information obtaining unit that obtains position information used for specifying a position in which the wireless communication apparatus is located, and a determining unit that determines, on the basis of the obtained position information, whether or not an area in which the wireless communication apparatus is located will be changed; and the controller performs control so that the first information will be updated if the determining unit determines that the area in which the wireless communication apparatus is located will be changed.

(5)

The information processing apparatus according to one of (2) to (4), wherein the controller performs control so that the frequency with which the second information is updated will be changed on the basis of a magnitude of a predetermined value included in the second information.

(6)

The information processing apparatus according to one of (2) to (5), wherein:

the information processing apparatus is the wireless communication apparatus;

the wireless communication apparatus further includes a sending frequency controller that controls the frequency with which the second information is sent to a different information processing apparatus; and the sending frequency controller controls the frequency with which the second information is sent to the different information processing apparatus on the basis of a magnitude of a predetermined value included in the second information.

(7)

The information processing apparatus according to one of (2) to (5), wherein:

the information processing apparatus is the wireless communication apparatus;

the wireless communication apparatus further includes a sending frequency controller that controls the frequency with which the second information is sent to a different information processing apparatus; and the sending frequency controller controls the frequency with which the second information is sent to the different information processing apparatus on the basis of a distance between the wireless communication apparatus and a base station which performs wireless communication with the wireless communication apparatus.

(8)

The information processing apparatus according to one of (1) to (7), wherein the first information indicates a ratio of the intensity of interference power output from one or a plurality of base stations located around the information processing apparatus or from a cell located around the information processing apparatus to the intensity of a pilot signal, a reference signal, or a beacon signal of a base station or a cell which performs wireless communication with the information processing apparatus.

(9)

The information processing apparatus according to one of (1) to (8), wherein the second information indicates a situation in which wireless resources are allocated to a base station which performs wireless communication with the information processing apparatus.

(10)

The information processing apparatus according to (9), wherein information indicating the situation in which wireless resources are allocated to the base station is an index regarding a ratio of power allocated to a data transmission channel per frame if a code division multiple access method is employed, and is an index regarding a ratio of the number of sub-carriers allocated to transmission data to the total number of sub-carriers per frame if an orthogonal frequency division multiplexing method is employed.

(11)

The information processing apparatus according to one of (1) to (10), further including:

an information combining unit that generates new information by combining the first information with the second information.

(12)

The information processing apparatus according to (11), wherein the information combining unit generates information concerning one or a plurality of wireless communication services as the new information, and displays the generated new information on a display unit.

(13)

The information processing apparatus according to (12), further including a setting unit that performs setting processing if one of the plurality of wireless communication services is selected, the setting processing being performed for utilizing the selected wireless communication service.

(14)

A communication system including:

a wireless communication apparatus including a manager that manages items of information concerning wireless communication managed in the wireless communication apparatus by categorizing the items of information into first information and second information in accordance with a degree by which an item of information changes over time, and a controller that performs control so that the first information and the second information will be updated with different frequencies; and an information processing apparatus that provides information for updating the first information and the second information in the wireless communication apparatus to the wireless communication apparatus.

(15)

The communication system according to (14), wherein the information processing apparatus includes a communication unit that receives items of second information managed in the wireless communication apparatus from the wireless communication apparatus, a setting unit that sets a period used for calculating an average value of the received items of second information, on the basis of the temporal-direction density of the received items of second information, an average value calculator that calculates an average value of the items of second information received during the period set by the setting unit, and a storage unit that stores therein the calculated average value of the items of second information as information for updating the second information in the wireless communication apparatus.

(16)

The communication system according to (15), wherein:

the information processing apparatus further includes a sending frequency notifying unit that determines the frequency with which the wireless communication apparatus sends the second information, on the basis of the number of samples of the items of second information received during the set period for which the average value is calculated, and that notifies the wireless communication apparatus of the determined frequency; and the wireless communication apparatus sends the second information managed in the wireless communication apparatus to the information processing apparatus on the basis of the determined frequency.

(17)

An information processing method including:

performing control so that first information and second information will be updated with different frequencies, on the basis of the content of management in which items of information concerning wireless communication managed in a wireless communication apparatus are managed by categorizing the items of information into the first information and the second information in accordance with a degree by which an item of information changes over time.

(18)

A method for controlling updating of information stored on a device, the information including information of a first type and information of a second type, the method including:

determining, using at least one processor, when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

(19)

The method of (18), wherein the determining includes determining a first updating frequency at which the first item of information is to be updated and a second updating frequency at which the second item of information is to be updated, wherein the second updating frequency is larger than the first updating frequency.

(20)

The method of (18), wherein determining when the second item of information is to be updated includes:

determining an average value for the second item of information over a period of time.

(21)

The method of (18), wherein information of the first type changes more slowly over time than information of the second type.

(22)

The method of (18), wherein determining when the first and second items of information are to be updated includes:

calculating a movement speed of the device at least in part by obtaining position information indicating a position at which the device is located.

(23)

The method of (18), wherein causing the device to update the first item information includes causing the device to:

request an updated version of the first item of information from the at least one other device; and in response to the request, receive the updated version of the first item of information from the at least one other device.

(24)

The method of (18), further including:

causing the device to display the second item of information superimposed on the first item of information.

(25)

The method of (24), wherein the first item of information is map information and the second item of information is at least one communication rate for at least one communication carrier.

(26)

The method of (18), wherein the first item of information is map information.

(27)

The method of (18), wherein the device is configured to communicate wirelessly with a base station, the first item of information is information related to intensity of a pilot, beacon, or reference signal received from the base station and/or information related to intensity of an interference signal received from the base station, and wherein the second item of information is information related to allocation of wireless resources to the base station.

(28)

The method of (18), wherein the device is configured to use a first communication service provided by a first communication carrier, the method further including: causing the device to use a second communication service provided by a second communication carrier instead of the first communication service.

(29)

The method of (28), wherein the first item of information is map information, the second item of information includes a first communication rate associated with the first communication service and a second communication rate associated with the second communication service, the method further including:

causing the device to display the first and second communication rates superposed on the map information; and when the device uses the second communication service, causing the device to display the first communication rate and second communication rate differently from when the device uses the first communication service.

(30)

The method of (18), wherein the method is performed by the device.

(31)

The method of (18), wherein the method is performed by the at least one other device.

(32)

At least one non-transitory computer readable storage medium storing processor-executable instructions that, when executed by at least one processor, cause the at least one processor to perform a method for controlling updating of information stored on a device, the information including information of a first type and information of a second type, the method including:

determining when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

(33)

A device, including:

at least one non-transitory computer-readable storage medium storing at least a first item of information of a first type and at least a second item of information of a second type; and at least one processor programmed to control updating of information stored on the at least one non-transitory computer-readable storage medium at least in part by:

determining when a first item of information of the first type and a second item of information of the second type are to be updated, wherein the second item of information is to be updated more frequently than the first item of information; and updating the first and second items of information in accordance with the determination at least in part by wirelessly communicating with at least one other device.

(34)

A system including:

a device comprising at least one non-transitory computer-readable storage medium storing at least a first item of information of a first type and at least a second item of information of a second type; and at least one computer configured to control updating of information stored on the at least one non-transitory computer-readable storage medium at least in part by:

determining when a first item of information of the first type and a second item of information of the second type are to be updated, wherein the second item of information is to be updated more frequently than the first item of information; and causing the device to update the first and second items of information in accordance with the determination at least in part by wirelessly communicating with at least one other device.

Some embodiments may comprise a non-transitory computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of processor-executable instructions) that, when executed on one or more computers or other processors, perform methods that implement the various embodiments discussed above. As is apparent from the foregoing examples, a non-transitory computer-readable storage medium may retain information for a sufficient time to provide computer executable instructions in a non-transitory form.

It should be understood by those skilled in the art that various modifications, combinations, sub-combinations and alterations may occur depending on design requirements and other factors insofar as they are within the scope of the appended claims or the equivalents thereof.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The present disclosure contains subject matter related to that disclosed in Japanese Priority Patent Application JP 2012-132467 filed in the Japan Patent Office on Jun. 12, 2012, the entire contents of which are hereby incorporated by reference.

REFERENCE SIGNS LIST 100 through 103, 300, 400, 450, 500, 550 Wireless communication apparatus
110 Communication unit
120 First-information storage unit
130 Second-information storage unit
140 Information combining unit
150 Display unit
160 Average value calculator
170 Updating frequency controller
180 Position information obtaining unit
190 Area determining unit
200 Updating information manager
310 Sending frequency controller
320 Current-position information obtaining unit
330 Current-position information storage unit
340 Current-position second information extracting unit
350 Current-position second information updating unit
410 Base-station distance obtaining unit 420 Sending frequency controller
470 Position precision determining unit
480 Sending frequency controller
510 Operation receiver
520 Contract authentication information setting unit
530 Wireless communication method setting unit
560 Wireless communication service selector
600 Communication system
610 Network
620 Communication control apparatus
621, 622 Base station
700 Server
710 Communication unit
720 First-information storage unit
730 Second-information storage unit
740 Second-information obtaining unit
750 First-information extracting unit
760 Averaging time setting unit
770 Average value calculator
780 Sending frequency notifying unit

The invention claimed is:

1. A method, comprising:
in a first device configured to store a first item of information and a second item of information:
setting, by at least one processor, the first item of information to a first type of information and the second item of information to a second type of information, wherein the first item of information is information to be superimposed on map information, the second item of information is information concerning wireless communication between a base station and the first device, and the second item of information is superimposed on the first item of information;
based on the wireless communication between the base station and the first device:
determining, by the at least one processor, a first updating frequency to update the first item of information;
determining, by the at least one processor, a second updating frequency to update the second item of information, wherein the second updating frequency is higher than the first updating frequency;
determining, by the at least one processor, a first time at which the first item of information is updated and a second time at which the second item of information is updated, based on the first updating frequency and the second updating frequency, respectively;
updating, by the at least one processor, the first item of information and the second item of information based on the first time and the second time, respectively;
determining, by the at least one processor, an average value corresponding to a change in value for the second item of information over a period of time; and
decreasing, by the at least one processor, the second updating frequency based on the determined average value being less than a threshold value, the second updating frequency corresponding to a sending frequency between the first device and the base station when a heavy load is imposed on the first device based on a relationship between the first device and the base station.

2. The method of claim 1, wherein the second time at which the second item of information is updated is determined based on the average value.

3. The method of claim 1, wherein a rate of change of the first item of information is lower than a rate of change of the second item of information.

4. The method of claim 1, further comprising:
calculating, by the at least one processor, a movement speed of the first device by obtaining position information indicating a position of the first device; and
determining, by the at least one processor, the first time and the second time based on the position of the first device.

5. The method of claim 1, further comprising:
requesting, by the at least one processor, an updated version of the first item of information from at least one second device; and
receiving, by the at least one processor, the updated version of the first item of information from the at least one second device based on the request.

6. The method of claim 1, further comprising controlling, by the at least one processor, the first device to display the second item of information superimposed on the first item of information.

7. The method of claim 6, wherein the second item of information includes at least a communication rate for at least one communication carrier.

8. The method of claim 1, further comprising communicating wirelessly with a base station, wherein the first item of information is one of first information or second information, wherein
the first information is associated with at least one of a pilot signal intensity, a beacon signal intensity, or a reference signal intensity received from the base station,
the second information is associated with an intensity of an interference signal received from the base station, and
the second item of information is associated with allocation of wireless resources to the base station.

9. The method of claim 1, further comprising:
controlling, by the at least one processor, the first device to:
display a first communication service managed by a first communication carrier; and
display a second communication service managed by a second communication carrier, wherein the display of the second communication service is visually distinguishable from the display of the first communication service.

10. The method of claim 9, wherein the second item of information comprises a first communication rate associated with the first communication service and a second communication rate associated with the second communication service, the method further comprising: controlling, by the at least one processor, the first device to display the first communication rate and the second communication rate superposed on the map information.

11. The method of claim 1, wherein the method is executed by at least one second device.

12. The method of claim 1, further comprising categorizing, by the at least one processor, the first item of information and the second item of information into one of the first type of information or the second type of information based on a position of the first device.

13. The method of claim 1, further comprising:
storing, by the at least one processor, the first type of information in a first memory; and
storing, by the at least one processor, the second type of information in a second memory.

14. A non-transitory computer-readable medium having stored thereon computer-executable instructions, which when executed by a processor of a first device, cause the first device to execute operations, the operations comprising:
in the first device configured to store a first item of information and a second item of information:
setting, by the processor, the first item of information to a first type of information and the second item of information to a second type of information, wherein the first item of information is information to be superimposed on map information, the second item of information is information concerning wireless communication between a base station and the first device, and the second item of information is superimposed on the first item of information;
based on the wireless communication between the base station and the first device:
determining, by the processor, a first updating frequency to update the first item of information;
determining, by the processor, a second updating frequency to update the second item of information, wherein the second updating frequency is higher than the first updating frequency;
determining, by the processor, a first time at which the first item of information is updated and a second time at which the second item of information is updated, based on the first updating frequency and the second updating frequency, respectively;
updating, by the processor, the first item of information and the second item of information based on the first time and the second time, respectively;
determining, by the processor, an average value corresponding to a change in value for the second item of information over a period of time; and
decreasing, by the processor, the second updating frequency based on the determined average value being less than a threshold value, the second updating frequency corresponding to a sending frequency between the first device and the base station when a heavy load is imposed on the first device based on a relationship between the first device and the base station.

15. A first device, comprising:
a memory configured to store a first item of information and a second item of information; and
at least one processor configured to:
set the first item of information to a first type of information and the second item of information to a second type of information, wherein the first item of information is information to be superimposed on map information, the second item of information is information concerning wireless communication between a base station and the first device, and the second item of information is superimposed on the first item of information; and
configured to, based on the wireless communication between the base station and the first device:
determine a first updating frequency to update the first item of information;
determine a second updating frequency to update the second item of information, wherein the second updating frequency is higher than the first updating frequency;
determine a first time at which the first item of information is updated and a second time at which the second item of information is updated, based on the first updating frequency and the second updating frequency, respectively;
update the first item of information and the second item of information based on the first time and the second time, respectively;
determine an average value corresponding to a change in value for the second item of information over a period of time; and
decrease the second updating frequency based on the determined average value being less than a threshold value, the second updating frequency corresponding to a sending frequency between the first device and the base station when a heavy load is imposed on the first device based on a relationship between the first device and the base station.

16. A system, comprising:
a first device that comprises a memory configured to store a first item of information and a second item of information; and at least one processor configured to:
set the first item of information to a first type of information and the second item of information to a second type of information, wherein the first item of information is information to be superimposed on map information, the second item of information is information concerning wireless communication between a base station and the first device, and the second item of information is superimposed on the first item of information; and
configured to, based on the wireless communication between the base station and the first device:
determine a first updating frequency to update the first item of information;
determine a second updating frequency to update the second item of information, wherein the second updating frequency is higher than the first updating frequency;
determine a first time at which the first item of information is updated and a second time at which the second item of information is updated, based on the first updating frequency and the second updating frequency, respectively;
cause the first device to update the first item of information and the second item of information based on the first time and the second time, respectively;
determine an average value corresponding to a change in value for the second item of information over a period of time; and
decrease the second updating frequency based on the determined average value being less than a threshold value, the second updating frequency corresponding to a sending frequency between the first device and the base station when a heavy load is imposed on the first device based on a relationship between the first device and the base station.

* * * * *